United States Patent
Yeager et al.

(10) Patent No.: US 10,322,828 B2
(45) Date of Patent: Jun. 18, 2019

(54) BOTTOM-GUSSETED PACKAGE AND HEAT-SEALING METHOD

(71) Applicant: Innoflex Incorporated, Mobile, AL (US)

(72) Inventors: James W. Yeager, Mobile, AL (US); John F. Hogan, Duluth, GA (US)

(73) Assignee: Innoflex Incorporated, Birmingham, AL (US)

( * ) Notice: Subject to any disclaimer, the term of this patent is extended or adjusted under 35 U.S.C. 154(b) by 500 days.

(21) Appl. No.: 14/848,029

(22) Filed: Sep. 8, 2015

(65) Prior Publication Data

US 2016/0067937 A1 Mar. 10, 2016

Related U.S. Application Data

(60) Provisional application No. 62/149,230, filed on Apr. 17, 2015, provisional application No. 62/047,335, filed on Sep. 8, 2014.

(51) Int. Cl.
*B31B 70/64* (2017.01)
*B65B 9/20* (2012.01)
(Continued)

(52) U.S. Cl.
CPC ............ *B65B 9/2056* (2013.01); *B29C 65/18* (2013.01); *B29C 66/1122* (2013.01);
(Continued)

(58) Field of Classification Search
CPC ..... B31B 29/00; B31B 70/645; B31B 70/642; B31B 2155/00; B31B 2160/20;
(Continued)

(56) References Cited

U.S. PATENT DOCUMENTS 2,720,247 A 10/1955 Richens
RE27,302 E * 2/1972 Schneider et al. .... B65B 9/2049
53/451
(Continued)

FOREIGN PATENT DOCUMENTS

JP 2004292028 A 10/2004
WO 2012099197 A1 7/2012

OTHER PUBLICATIONS

Supplementary Partial European Search Report and Provisional Opinion dated Apr. 21, 2017.
(Continued)

*Primary Examiner* — Sameh Tawfik
(74) *Attorney, Agent, or Firm* — Wood, Phillips, Katz, Clark & Mortimer

(57) ABSTRACT

A bottom-gusseted package comprises a package body, and a bottom gusset positioned transversely of a longitudinal axis of the package body. Formation of the bottom-gusseted package is effected by positioning individual sleeves transversely of the longitudinal axis of a flexible web which forms the package body. During package formation, the flexible web is cut to form individual packages, with each individual sleeve positioned to form a bottom gusset in a respective package. Cooperating heat-sealing jaws, including cooperating U-shaped sealing surfaces, act to integrate and seal each individual sleeve with the flexible web to form the bottom gusset of each package, with the heat-sealing jaws preferably configured to include cooperating top sealing surfaces for simultaneously forming a top seal in an adjacent one of the packages.

14 Claims, 17 Drawing Sheets

(51) Int. Cl.
| | |
|---|---|
| *B65B 51/30* | (2006.01) |
| *B65B 59/00* | (2006.01) |
| *B65B 59/04* | (2006.01) |
| *B29C 65/18* | (2006.01) |
| *B29C 65/00* | (2006.01) |
| *B65D 75/00* | (2006.01) |
| *B65D 30/10* | (2006.01) |
| *B31B 155/00* | (2017.01) |
| *B31B 160/20* | (2017.01) |
| *B29C 65/30* | (2006.01) |
| *B29L 31/00* | (2006.01) |

(52) U.S. Cl.
CPC .......... *B29C 66/133* (2013.01); *B29C 66/346* (2013.01); *B29C 66/4312* (2013.01); *B29C 66/4322* (2013.01); *B29C 66/4722* (2013.01); *B29C 66/8167* (2013.01); *B29C 66/81427* (2013.01); *B29C 66/81431* (2013.01); *B29C 66/841* (2013.01); *B29C 66/849* (2013.01); *B29C 66/8412* (2013.01); *B65B 9/2042* (2013.01); *B65B 51/303* (2013.01); *B65B 59/00* (2013.01); *B65B 59/04* (2013.01); *B29C 65/305* (2013.01); *B29C 66/81433* (2013.01); *B29C 66/81435* (2013.01); *B29L 2031/7128* (2013.01); *B31B 70/642* (2017.08); *B31B 70/645* (2017.08); *B31B 2155/00* (2017.08); *B31B 2155/0012* (2017.08); *B31B 2160/20* (2017.08); *B65D 31/16* (2013.01); *B65D 75/008* (2013.01)

(58) Field of Classification Search
CPC ............ B31B 2155/0012; B29C 65/18; B29C 66/1122; B29C 66/133; B29C 66/346; B29C 66/4312; B29C 66/4322; B29C 66/81427; B29C 66/81431; B29C 66/8167; B65B 9/2042; B65B 9/2056; B65B 59/00; B65B 59/04; B65D 33/00; B65D 31/16; B65D 75/008
USPC .......................................................... 493/194
See application file for complete search history.

(56) References Cited

U.S. PATENT DOCUMENTS

| | | | | |
|---|---|---|---|---|
| 4,000,029 | A * | 12/1976 | Michaels | B29C 65/242 156/510 |
| 4,895,556 | A * | 1/1990 | Jensen | B29C 66/80 156/583.1 |
| 4,909,017 | A * | 3/1990 | McMahon | B65B 61/188 156/66 |
| 4,913,693 | A * | 4/1990 | Ball | B65D 33/065 493/194 |
| 5,015,223 | A * | 5/1991 | Boeckmann | B29C 65/18 156/581 |
| 5,826,401 | A | 10/1998 | Bois | |
| 6,393,804 | B1 * | 5/2002 | Ausnit | B31B 70/00 493/203 |
| 6,425,847 | B1 * | 7/2002 | Broenstrup | B31B 70/00 493/186 |
| 6,634,158 | B1 * | 10/2003 | Bois | B65B 9/20 53/551 |
| 6,719,678 | B1 | 4/2004 | Stern | |
| 6,928,791 | B2 * | 8/2005 | Ausnit | B65B 9/20 53/133.2 |
| 6,941,726 | B2 * | 9/2005 | Ausnit | B65B 9/04 493/394 |
| 7,335,149 | B1 | 2/2008 | Hanson | |
| 7,413,535 | B2 * | 8/2008 | Schneider | B65D 33/25 493/394 |
| 7,775,957 | B2 * | 8/2010 | Totani | B65D 31/10 493/189 |
| 8,414,465 | B2 * | 4/2013 | Totani | B65D 31/10 493/162 |
| 8,623,167 | B2 * | 1/2014 | Kim | B29C 66/1122 156/285 |
| 9,050,770 | B1 * | 6/2015 | Russell | B31B 29/60 |
| 2002/0094922 | A1 | 7/2002 | Edwards et al. | |
| 2007/0092166 | A1 * | 4/2007 | Anzini | B65B 9/20 383/63 |
| 2014/0161373 | A1 | 6/2014 | Yeager | |

OTHER PUBLICATIONS

International Search Report and Written Opinion for the corresponding PCT application No. PCT/US2015/048816 dated Dec. 7, 2015.

* cited by examiner

BOTTOM-GUSSETED PACKAGE AND HEAT-SEALING METHOD

TECHNICAL FIELD

The present invention relates generally to packages formed from polymeric film webs, and more particularly to a method of forming a bottom-gusseted package including a bottom gusset positioned transversely of a longitudinal axis of the package, with the configuration of the package, and its method of formation with a pair of cooperating heat-sealing jaws, permitting use with associated form, fill, and seal equipment.

BACKGROUND OF THE INVENTION

Packages formed from plastic, polymeric film material have found widespread application in the market place for convenient and efficient packaging of all manner of food and non-food products. Packages of this nature typically are formed by folding and sealing a web of polymeric material to form a package body having front and rear package panels, with the package panels joined to each other at margins thereof. Depending upon the method of formation, the front and rear package panels may be joined to each other either by folded portions of the package body, or at seals (typically heat seals) joining the package panels to each other.

Non-gusseted packages of this type are sometimes referred to as "pillow packs", and do not include either side gussets or top or bottom gussets. However, for many applications it is desirable to form a gusseted package that is, providing the package with inwardly-extended, pleat-like gussets at one or more margins of the package body. For example, side-gusseted packages include inwardly extending side gussets at opposite lateral sides of the package body, which side gussets join respect lateral edges of the front and rear package panels to each other.

For some applications, it is especially desirable to provide a bottom-gusseted package, that is, a package having an inwardly extending gusset at the bottom of the package body. By virtue of the breadth and stability provided by the bottom gusset, packages of this nature can frequently be configured to be self-standing, promoting efficient display for consumer selection.

Heretofore, bottom-gusseted packages have typically been formed by pleating a web of polymeric material in a direction parallel to the longitudinal axis of the web. Suitable ploughs and forming guides shape and configure the polymeric web as it moves longitudinally, including formation of a continuous, inwardly extending bottom gusset in the web material. Subsequently, suitable seals are formed transversely of the web to define individual package bodies, each including front and rear package panels, with each including a bottom gusset. Individual package bodies are formed by cutting the web of material at the transversely extending seals, with the contents of each package deposited therein either before or after cutting of the web into individual packages. Formation of an upper seal, at the margin of the folded polymeric web opposite the bottom gusset, closes and seals each package body. By this formation technique, the bottom gusset has a width that corresponds to and is the same as the width of the front and rear package panels.

As will be appreciated by this typical formation technique, the height or vertical dimension of each package body is approximately equal to one-half of the width of the polymeric web, less the dimension of the bottom gusset. As a consequence, the maximum height of any package being formed is essentially limited by the maximum width of the web of polymeric material which the forming equipment is capable of handling.

The present invention contemplates a method of forming a bottom-gusseted package, including the operation of a pair of cooperating heat-sealing jaws, which addresses the shortcomings in the conventional forming of bottom-gusseted package. This is achieved by forming each package with a bottom gusset positioned transversely of the longitudinal axis of the polymeric film web and each package. The bottom-gusseted packages of any selected height can be readily and efficiently formed.

SUMMARY OF THE INVENTION

A method of forming a bottom-gusseted package embodying the principles of the present invention includes providing a pair of cooperating heat-sealing jaws to facilitate efficient package formation, such as in conjunction with filling of the package by use of a form, fill and sealing apparatus.

The present method comprises forming a package body formed from a flexible web having a longitudinal axis. The flexible web is folded to define a front package panel and a rear package of the package body. The front and rear package panels are joined to each other at respective lateral side margins of the package body, with the flexible web being joined to itself along a seam which extends parallel to the longitudinal axis of the flexible web.

Notably, a package formed in accordance with the present invention includes a bottom gusset positioned between the front and rear package panels, with the bottom gusset extending upwardly and inwardly from the lower edges of the front and rear package panels. By formation of the present package in accordance with the present invention, the bottom gusset is positioned within the package body transversely of the longitudinal axis of the package body, and transversely of the longitudinal axis of the flexible web from which the package body is formed. As a consequence, a package body can be very efficiently formed at any selected height, without necessarily being limited by the width of the flexible web from which the package is formed. Suitable polymeric material can be employed by virtue of its liquid-impermeable characteristics, and heat-sealing capabilities.

As will be appreciated, package formation can be very efficiently effected in conjunction with package filling on a so-called form, fill and seal packaging machine. It is presently contemplated that a rolled web of fill having gusset-forming sleeves joined thereto can be fed to a form, fill and seal machine for package formation and filling. During use in this manner, individual, filled bottom-gusseted packages are formed. A package formed in accordance with the present method can include lateral margins of the flexible web which are joined to provide a seam at one side edge of the package, or a seam at which the web material is joined to itself positioned in the rear package panel. By virtue of the formation technique, the bottom gusset of the package extends less than the width of the front and rear package panels.

The individual sleeves are joined in spaced apart relationship longitudinally of the flexible web, with the spacing between the individual sleeves corresponding to the length of each of the bottom-gusseted packages being formed, with laterally-extending edges portions of each individual sleeve oriented toward a bottom of the respective package. It is presently preferred that an inside surface of the folded, sleeve-forming web non-thermally bondable to itself, ie, does not heat-seal to itself, thus facilitating formation of a bottom gusset which spreads or opens to permit the packages being formed to be generally self-standing.

After the individual sleeves are joined to the flexible web, the flexible web is folded and joined along lateral margins thereof to form a generally tubular, folded flexible web. The individual sleeves are positioned generally within the folded flexible web, in spaced apart relationship. Folding of the flexible web material forms a package body for each of the bottom-gusseted packages, with each package body including a front package panel and a rear package panel joined at opposite side margins thereof.

The present invention contemplates that a pair of cooperating sealing jaws are provided for heat-sealing each of the individual sleeves to form the bottom gusset in each one of the packages. Notably, the sealing jaws include respective, cooperating, U-shaped sealing surfaces each including: (1) a pair of side sealing surfaces to heat-seal opposite lateral margins of each individual sleeve to the respective front and rear package panels at lateral margins thereof, and (2) a transverse sealing surface extending between said side sealing surfaces to respectively heat-seal the laterally-extending edges portions of each sleeve to the front and rear package panels at the bottom of each one of said packages.

Next, the folded flexible web is cut at intervals each corresponding in length to the length of each of the bottom-gusseted packages being formed. The individual sleeves are positioned generally within the folded, flexible web, with the individual sleeves providing the bottom gusset for a respective one of the packages being formed.

Efficient package formation is promoted by configuring each of said individual sleeves to have a length which is less than the width of the folded web of flexible material. This provides formation of the bottom gusset with a width less than the width of the package, to permit formation of side seals between the front and read package panels of each package at opposite side edges of the bottom gusset of the package. Each of these side seals overlaps a respective end of the bottom gusset of the package.

In the presently preferred practice of the invention, the sealing jaws each further a transverse, top sealing surface, spaced from the respective U-shaped sealing surface. The top sealing surfaces of the heat-sealing jaws cooperate to heat-seal the front and rear package panels to each other to form a top seal, in an adjacent one of said packages, simultaneously with heat-seals formed by the U-shaped sealing surfaces. It is contemplated that spacing between at least a portion of the top sealing surfaces is less than the spacing between the U-shaped sealing surfaces, when the pair of sealing jaws are in a closed orientation, by a dimension at least equal to the thickness of each folded, individual sleeve. By dimensioning the top sealing surfaces in this manner, efficient heat-sealing of the package can be achieved, notwithstanding variations in thickness in different portions of each package, which can vary depending upon the specific number of plies or layers of film in at any particular package portion.

Similarly, the sealing jaws can be configured such that the spacing between the transverse sealing surfaces of the U-shaped sealing surfaces is greater than the spacing being between the side sealing surfaces of the U-shaped sealing surfaces, when the sealing jaws are in the closed position. Again, this acts to ensure efficient sealing and package formation, notwithstanding differences in the thickness of various portions of the package, such as the relatively increased thickness in each package at the longitudinal seam of the package, where the web of material from which the package is formed is joined to itself. Depending upon the specific configuration of the longitudinal seam, the package can be two plies or layers thicker, such as the case with a so-called fin seal which is folded against the rear package panel.

Attendant to typical package formation, a portion of each individual gusset-forming sleeve extends into, and becomes part of, the top seal region of an adjacent one of the packages. Again to accommodate variations in package thickness by virtue of differences the number of plies or layers, it is contemplated that the sealing jaws can be configured such that the top sealing surfaces include first portions spaced apart by a dimension which is the same as the spacing between the transverse sealing surfaces of the U-shaped sealing surfaces, and second portions spaced apart by a dimension which is the same as the spacing between the side sealing surfaces of the U-shaped sealing surfaces, when the sealing jaws are in said closed position.

The present method contemplates efficient seal formation by forming each of the side seals of each package with a dimension of at least $G_{SS}$, wherein each of the side sealing surfaces has a transverse dimension greater than $G_{SS}$. Efficient formation is further facilitated by providing each of the individual sleeves with a lateral dimension to form a respective gusset having a width of $G_W$, wherein the spacing between the side sealing surfaces of each of said sealing jaws is less than or equal to $G_W$ minus two times $G_{SS}$.

An important aspect of the preferred practice of the invention promotes efficient, high-speed formation. Specifically, the present method includes intermittently advancing the flexible web of material after the individual sleeves have been joined thereto, wherein the flexible web of material is advanced with a tolerance range of dimension $T_{LD}$. This tolerance range is dependent upon the specific operational parameters of the forming apparatus, such as the associated form, fill, and seal machine. To accommodate the inevitable variations that occur attendant to high-speed packaging, each of the bottom gussets is formed having a height $G_H$, with each of the side sealing surfaces of the U-shaped sealing surfaces extending upwardly from the respective transverse sealing surface by a dimension that is greater than or equal to $G_H$ plus two times $T_{LD}$.

Additional features of the present invention promote versatility and flexibility for practice of the invention. Packages having differently sized or configured bottom gussets can readily be forming by providing the sealing jaws with features which permit the specific configuration of the heat-seals to be readily altered. Such features include providing each of one of the sealing jaws with a removable sealing jaw portion which provides at least a portion of the U-shaped shaped sealing surface. Alternatively, the sealing jaws can be configured such that the pair of side sealing surfaces of each one of the sealing jaws is laterally adjustable. In another illustrated embodiment, each one of the sealing jaws includes at least one removable insert element for adjusting the spacing between the pair of side sealing surfaces, again permitting formation of differently sized packages on the same piece of processing equipment.

Versatile use of the present heat-sealing arrangement is promoted by configuring the sealing jaws to be readily modified for manufacture of non-gusseted packages, such as so-called pillow-pack packages. To this end, the side sealing surfaces of each sealing jaws can be provided by a removable portion of each sealing jaw. Similarly, at least a portion of the top sealing surfaces of each jaw is provided by a removable portion of the jaw. By simply removing the removable jaw portions, the jaws can be readily re-configured for formation of packages without a bottom gusset, such as a so-called pillow pack package.

Experience has shown that for some applications, the contents of bottom-gusseted packages can tend to outwardly deform or bulge the package in the region above the bottom gusset of the package. To minimize this effect, the pair of side sealing surfaces of each one of the sealing jaws can be provided with sealing surfaces for heat-sealing said front and rear package panels to each other above the respective one of the individual sleeves forming the bottom gusset.

The specific composition of the materials from which the package body and bottom gusset are formed can be selected as appropriate for specific applications. For example, the sleeve-forming web, which forms the bottom gussets, can be made from a material which is different than the flexible web which forms the package body.

Other features and advantages of the present invention will become readily apparent from the following detailed description, the accompanying drawings, and the appended claims.

DETAILED DESCRIPTION

Figure 1:
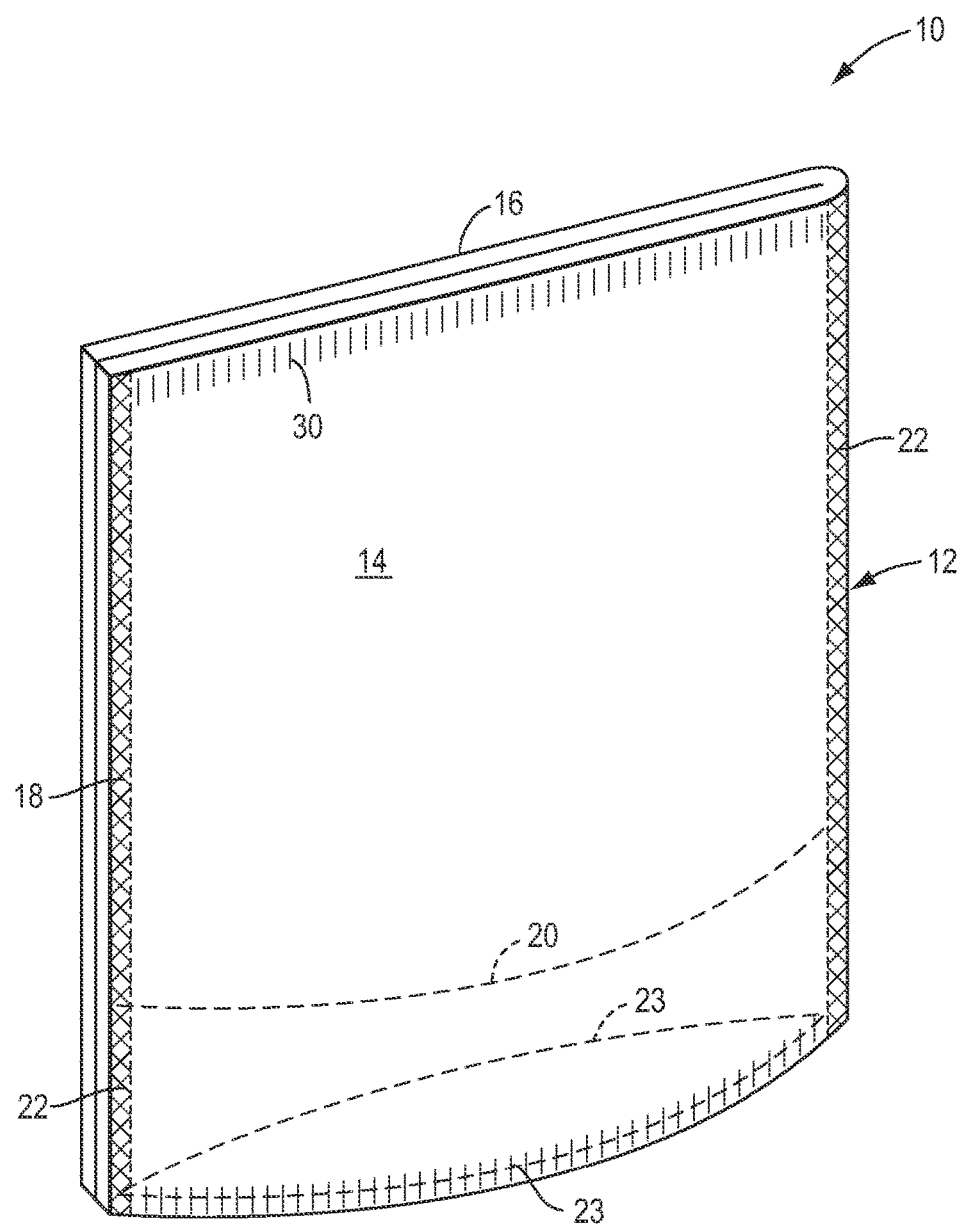
FIG. 1 is a perspective view of a bottom-gusseted package, embodying the principles of the present invention.

While the present invention is susceptible of embodiment in various forms, there is shown in the drawings and will hereinafter be described the presently preferred embodiments, with the understanding that the present disclosure should be considered as an exemplification of the invention, and is not intended to limit the invention to the specific embodiments illustrated.

U.S. Pat. Nos. 4,909,017, 4,617,683, 5,902,047, 6,971,794, and 8,182,407, illustrate various package constructions and formation methods, and are all hereby incorporated by reference.

Figure 2:
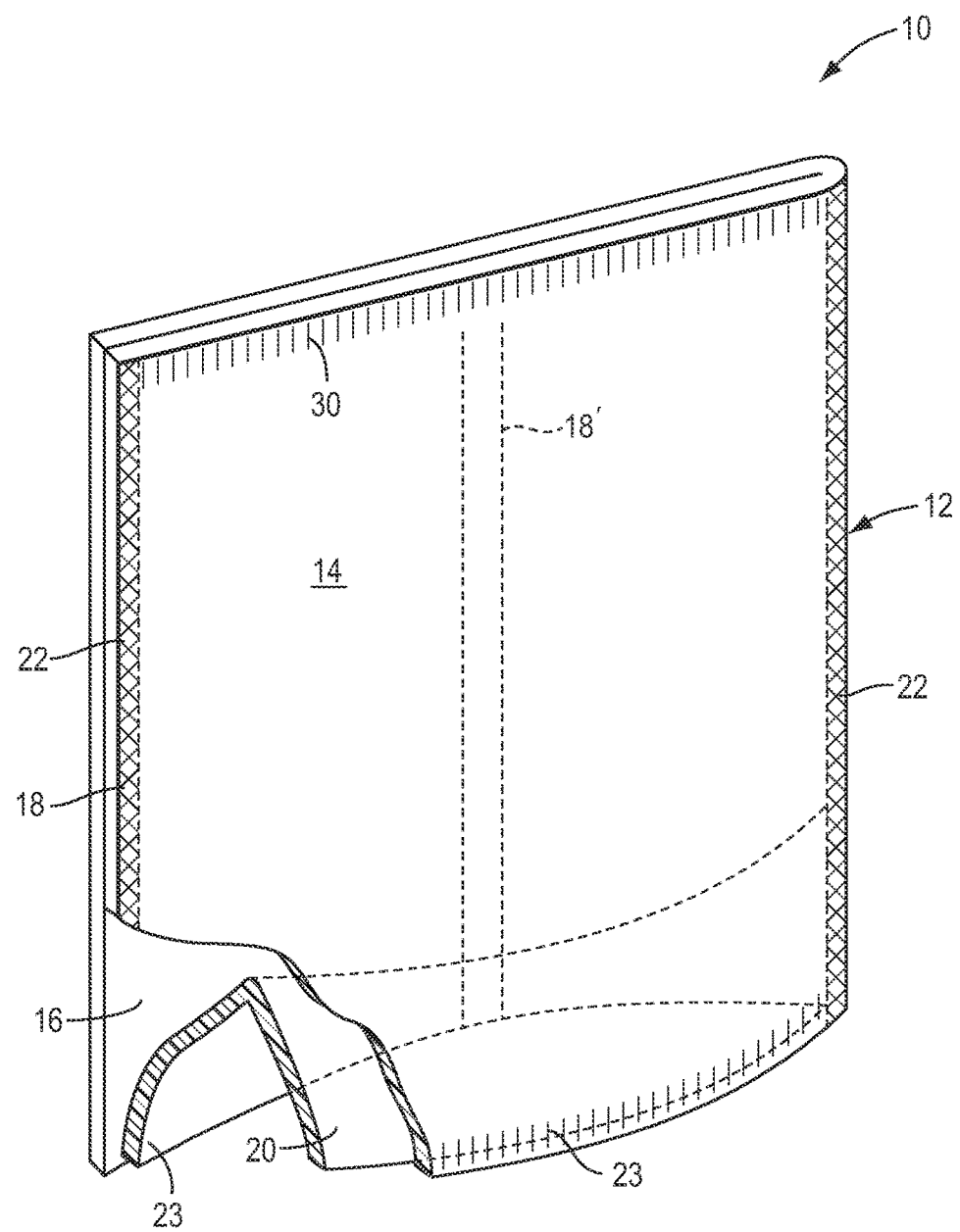
FIG. 2 is a perspective view similar to FIG. 1, with portions of the package cut away to illustrate the bottom gusset of the package.

With reference first to FIGS. 1 and 2, therein is illustrated a bottom-gusseted package 10 embodying the principles of the present invention. As will be further described, bottom-gusseted package 10 is configured to facilitate formation and filling on an associated, so-called form, fill and seal packaging machine, as is known in the art. Typically, the present invention can be practiced by partial formation of the present package as a rolled web of flexible, polymeric film material, with individual sleeves positioned thereon, which is supplied to the form, fill and seal apparatus. The formation of each package is completed attendant to filling of each of the packages with the desired quantity of product.

With further reference to FIGS. 1 and 2, the bottom-gusseted package 10 illustrated therein includes a package body 12 formed from a flexible film web having a longitudinal axis, wherein the flexible web has been folded to define a front package panel 14 and a rear package panel 16 of the package body 12. The front and rear package panels 14 and 16 are joined to each other at respective lateral side margins of the package body 12. In the illustrated embodiment, the front and rear package panels are joined to each other where the flexible film web from which the body is formed has been folded generally at its longitudinal axis, at one side edge of the package. The flexible film web from which the package body 12 is formed is joined to itself along a longitudinal seam 18 which extends parallel to the longitudinal axis of the flexible web. While seam 18 has been illustrated generally at the lateral, side edge of the package, opposite the fold formed along the longitudinal axis, the flexible web can otherwise be joined to itself, such as along a longitudinal seam 18' positioned in the rear package panel 16, as shown in phantom line in FIG. 2.

In accordance with the present invention, package 10 includes a bottom gusset 20 which is positioned between the front and rear package panels 14 and 16, and which extends upwardly and inwardly from lower edges of the front and rear package panels. As will be further described, the pleat-like bottom gusset 20 is formed from a sleeve of material which is positioned within the flexible web from which the package body is formed.

The bottom gusset 20 is joined to and integrated with the package body by a pair of side seals 22 at opposite lateral margins of the package body. In the illustrated embodiment, one of the side seals 22 coincides with, and can be provided by, the longitudinal seam 18 of the package 10. For some applications, it may be desirable to form side seals 22, adjacent bottom gusset 20, which do not extend the full length of the package. A pair of bottom end seals 23 respectively join the edges of the bottom gusset 20 to the front and rear package panels 14 and 16, to provide a bottom seal for the package, with the upper edge portions of the front and rear package panels joined at a heat-sealed top end seal 30. By virtue of the formation technique, the bottom gusset 20, including those portions of the gusset sealed at the side seals 22, extends less than the width of the front and rear package panels 14, 16. In previous bottom gusseted packages, the bottom gusset typically extends the full width of the package, so that the length of the gusset is same as the width of the front and rear package panels.

As will be appreciated, access to the contents of the package 10 can be provided configuring the package to include a suitable preferentially weakened region, such as a score line or the like. For some applications, it can be desirable to provide the front panel of the package with a recloseable fastener assembly, such as disclosed in the afore-mentioned patents. Other suitable opening arrangements can be provided as may be desired.

With reference now to FIGS. 3-9, formation of the bottom-gusseted package 10 will be described. For package formation, a flexible web 40 preferably comprising heat-sealable polymeric material is provided, with a flexible web typically advanced in a direction along its longitudinal axis. Formation of the present bottom-gusseted package is further effected by providing a flexible, sleeve-forming web 42, also preferably comprising suitable polymeric, heat-sealable material. The composition of the sleeve-forming web can differ from the flexible web 40 for forming the package of the body, as may be desired. It is presently contemplated that only one side of the sleeve-forming web be heat-sealable, so that the inside surface of the folded, sleeve-forming web does not heat seal to itself. This permits the eventual opening and spreading of the legs of the bottom gusset 20 so that the package 10 can assume a generally self-standing orientation.

Figure 3:
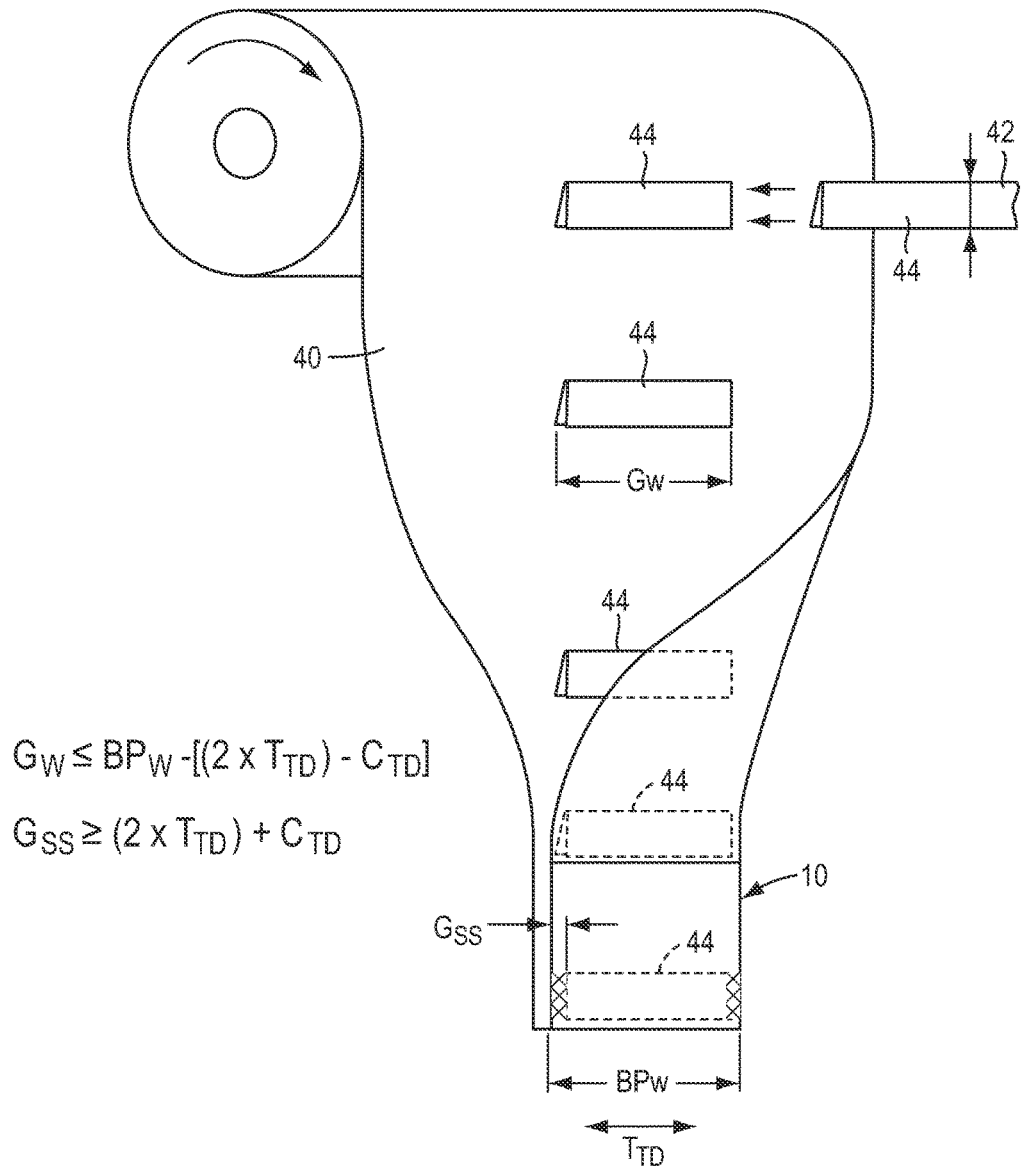
FIG. 3 is a diagrammatic view illustrating formation of the package shown in FIGS. 1 and 2, in accordance with the present invention.
Figure 4:
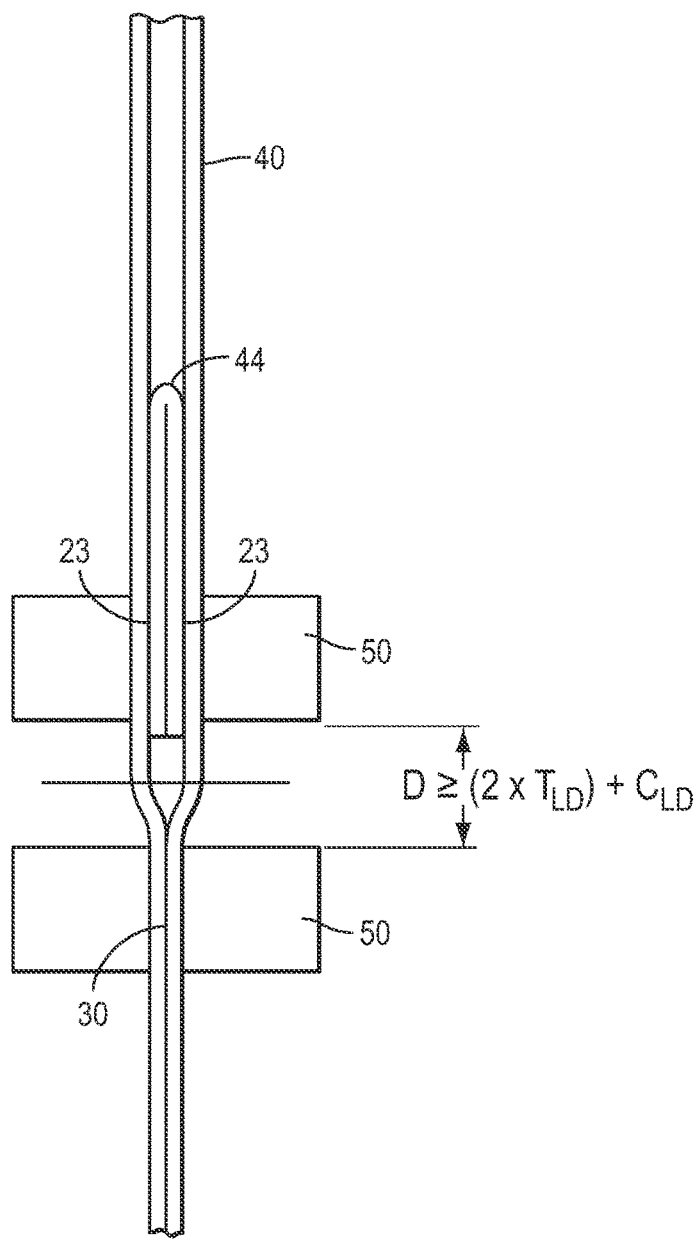
FIG. 4 is a diagrammatic view further illustrating formation of the present package.

As shown on FIG. 3, the sleeve-forming web 42 may be provided with a tubular configuration. Individual sleeves 44 are cut from the sleeve-forming web 42, and are positioned transversely of the longitudinal axis of the flexible web 40 from which the package body is formed. For some applications, it can be desirable to close or seal each individual sleeve 44, such as with suitable adhesive. This can be desirable to maintain the sleeves in a generally closed, flattened configuration, as packages are being formed, including during advancement through the associated form, fill and seal apparatus.

The individual sleeves 44 are joined to the flexible web 40 in spaced apart relationship longitudinally of the web 40. The spacing between the individual sleeves 44 corresponds to the length of each of the bottom-gusseted packages 10 being formed, with laterally-extending edges portions of each individual sleeve oriented toward a bottom of the respective package. Each of the sleeves 44 is joined, such as by heat-sealing, to the web 40, such as by seals provided at the ends of each sleeve, with the sleeves 44 joined in a manner which does not inhibit the eventual opening and splaying of each sleeve as it becomes the bottom gusset of a resultant package.

After each of the individual sleeves 44 is joined to the flexible web 40, the flexible web is folded and the lateral margins thereof joined together to form a folded flexible web. In this way, a package body is formed for each of the bottom-gusseted packages. By folding of the flexible web 40, the front and rear package panels 14 and 16 of each package are formed. The folded flexible web 40 can be joined to itself so as to form longitudinal seam 18, with the front and rear package panels joined to each other at the lateral margins of the folded web. As illustrated, the individual sleeves 44 are positioned within the folded flexible web 40.

It is presently contemplated that formation in this manner can be effected, if desired, during packaging on a form, fill, and seal machine, or that individual packages can be formed for subsequent filling. Depending upon the specific formation technique, side seals 22 are typically formed prior to filling, with each of the side seals overlapping the respective end of the bottom gusset 20, with one of end seals 23 formed after the contents of each package have been positioned therein.

In connection with formation of the bottom end seals 23, an important aspect of the preferred practice of the invention promotes efficient, high-speed formation. Specifically, the present method includes intermittently advancing the flexible web of material 40 after the individual sleeves 44 have been joined thereto, such as during advancement through the associated form, fill and seal machine. During this process, the flexible web of material is advanced with a longitudinal tolerance range of dimension $T_{LD}$, that is, is advanced with a precision that varies, plus or minus, by a generally known amount. This specific tolerance range is typically dependent upon the specific operational parameters of the forming apparatus, such as the associated form, fill, and seal machine, with the tolerance range typically increasing at increasing operating speeds. Additionally, it will appreciated that there can be some inaccuracy in the longitudinal positioning of the individual sleeves 44 on the flexible web of material 40, with this range of longitudinal variation, which may be zero, designated $C_{LD}$.

Notably, the present method includes forming top and bottom seals end 30, 23 in adjacent ones of the packages being formed by operation of a pair of heat sealing jaws 50, as will be further described. Notably, the spacing between the top and bottom end seals of adjacent ones of the packages is equal to or greater than the sum of: (1) two times the tolerance range with which the flexible 40 is advanced (e.g., $2 \times T_{LD}$), and (2) the range of variation of the longitudinal placement of each sleeve 44 (e.g., $C_{LD}$). This is diagrammatically illustrated in FIG. 4, which shows the cooperating heat-sealing jaws 50, 50 positioned to provide a dimension D between the end seals 23, 30 of adjacent packages, which is equal to or greater these combined tolerances. This ensures proper sealing of the ends of each package, with each bottom gusset properly sealed and configured to open or splay for providing the desired interior volume to the package, and desired self-standing characteristics. Thus, the spacing between the top and bottom end seals of adjacent ones of the packages is equal to or greater than two times $T_{LD}$, plus $C_{LD}$.

As will be recognized by those familiar with the art, this type of machine intermittently advances packaging material through the machine, with typical variation with respect to the web-cutting apparatus being plus/minus 0.25 inches. Thus, a typical sleeve portion 44 can be provided with a folded width of approximately 3 inches, with seals formed joining each sleeve portion 44 to the web 40 being of sufficient length and width to accommodate this variation, while still ensuring that a sufficiently large portion of each seal remains, after cutting of the web, to form the bottom end seals 23 and the top seals 30 of the necessary size to ensure package integrity. As will be appreciated, this dimensioning is meant to be illustrative, but it will be recognized that the present invention can readily be practiced to accommodate this typical cutting position variation of a typical forming apparatus.

Efficient package formation is promoted by configuring each of said individual sleeves to have a length which is less than the width of the folded web of flexible material. This provides formation of the bottom gusset with a width less than the width of the package, to permit formation of side seals 22 between the front and read package panels 14, 16 of each said package at opposite side edges of the bottom gusset 20 of the package. As noted each of these sides seals 22 overlaps a respective end of the bottom gusset 20 of the package 10.

The preferred dimensioning of the individual sleeves 44 for formation of respective bottom gussets 20, and the preferred dimensioning of the side seals 23 joining the front and rear package panels 14, 16 is illustrated in FIG. 3. As discussed above in connection with end seals of the packages, this preferred dimensioning accommodates manufacturing variations and tolerances.

As will be appreciated, the flexible web of material 40 can exhibit some transverse variation in its positioning as it is intermittently advanced, with this transverse tolerance range being designated $T_{TD}$. Additionally, each of the individual sleeves 44 being positioned transversely of said flexible web of material may exhibit some variation in the positioning transversely of the web of material 40, with this transverse tolerance range being designated $C_{TD}$.

Given these inevitable minor variations in the manufacturing process, it is contemplated that the width of the package gusset, designated $G_W$, which corresponds to the length of each individual sleeve 44, be selected to correspond to the width of the front and rear package panels, designated $B_{PW}$. As shown, this relationship can be stated as the gusset width $G_W$ is less than or equal to: (1) the package panel width $B_{PW}$, (2) less two times the tolerance range $T_{TD}$, and (3) less the tolerance range $C_{TD}$.

In turn, the side seals 22 which are formed in each package joining the front and rear package panels 14, 16 at opposite side edges of the bottom gusset of the package are dimensioned to ensure the preferred overlapping of the side seals with the opposite ends of the respective bottom gusset. As shown, the width dimension of each side seal, designated $G_{SS}$, is equal to or greater than: two times the transverse tolerance range $T_{TD}$, plus the transverse tolerance range $C_{TD}$. Again, this ensures the preferred overlapping of the side seals with the associated gussets, notwithstanding the normal manufacturing tolerances exhibited by the equipment employed for practicing the present invention.

With specific reference now to FIGS. 5-9, the specific features of the cooperating sealing jaws 50 are illustrated. The sealing jaws 50 cooperate to heat-seal each of the individual sleeves 44 to form the bottom gusset 20 in each one of 10 packages, and further preferably function to simultaneously form the top seal 30 in an adjacent one of the packages 10.

To this end, each of the sealing jaws 50 includes a respective U-shaped sealing surface including: (1) a pair of side sealing surfaces 52 to heat-seal opposite lateral margins of each individual sleeve 44 to the respective front and rear package panels at lateral margins thereof, and (2) a transverse sealing surface 54 extending between the side sealing surfaces 52 to respectively heat-seal the laterally-extending edges portions of each sleeve 44 to the front and rear package panels at the bottom of each one of said packages.

In the preferred form, the cooperating sealing jaws 50 are configured to form a top seal 30 in an adjacent one of the packages simultaneously with the heat-sealing of each individual sleeve to form the bottom gusset of one of the packages. Accordingly, each of the sealing jaws 50 further includes a transverse, top sealing surface 56 spaced from the respective U-shaped sealing surface including side sealing surfaces 52 and transverse sealing surface 54.

In order to facilitate efficient heat-sealing during package formation, the spacing between the top sealing surfaces 56 is less than the spacing between the U-shaped sealing surfaces by a dimension equal to the thickness of each folded, individual sleeve 44, when the pair of sealing jaws are in a closed orientation. This relationship is diagrammatically illustrated in FIGS. 6, 7, and 8, wherein the thickness of the folded sleeve 44 is shown as $G_T$, e.g., the thickness of the folded gusset 20 of the package.

Figure 8:
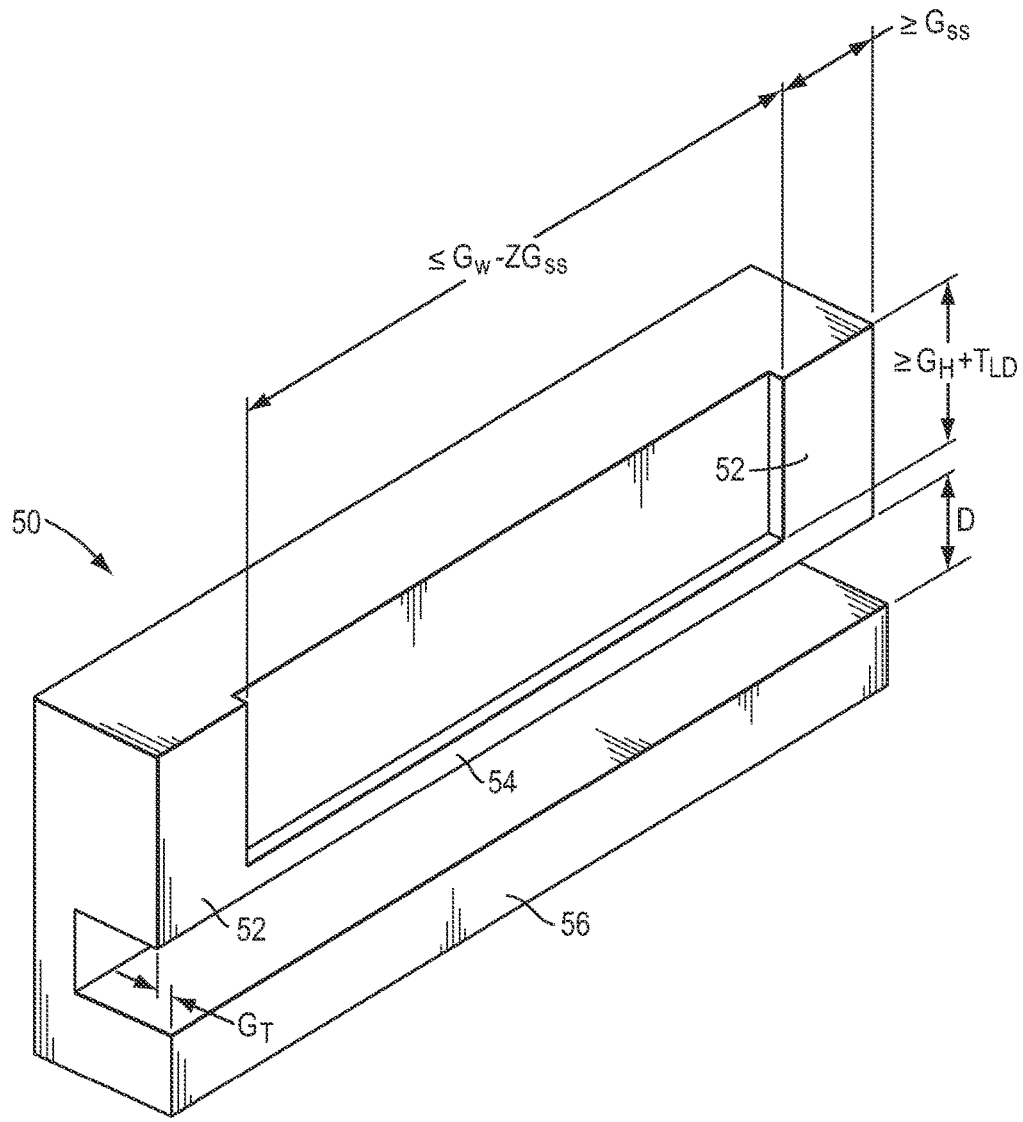
FIG. 8 is a diagrammatic view similar to FIG. 5 showing preferred dimensional aspects of the illustrated heat-sealing jaw.

Further preferred dimensional features of the sealing jaws 50 are shown in FIG. 8. Each of the package side seals 22 is formed with a dimension of least $G_{SS}$, with each of the side sealing surfaces 52 in turn having a transverse dimension greater than $G_{SS}$. Where each of the individual sleeves 44 has a lateral dimension to form a respective gusset 20 having a width of $G_W$, the spacing between the side sealing surfaces 52 of each of said sealing jaws 50 is less than or equal to $G_W$ minus two times $G_{SS}$.

As noted, during typical package formation on a form, fill and seal apparatus, the flexible web of material is advanced intermittently, wherein the flexible web of material is advanced with a tolerance range of dimension $T_{LD}$. When each of the gussets 20 is provided with a height $G_H$, each of the side sealing surfaces 52 of said U-shaped sealing surfaces of the sealing jaws 50 extends upwardly from the respective transverse sealing surface 54 by a dimension that is greater than or equal to $G_H$ plus two times $T_{LD}$.

Figure 9:
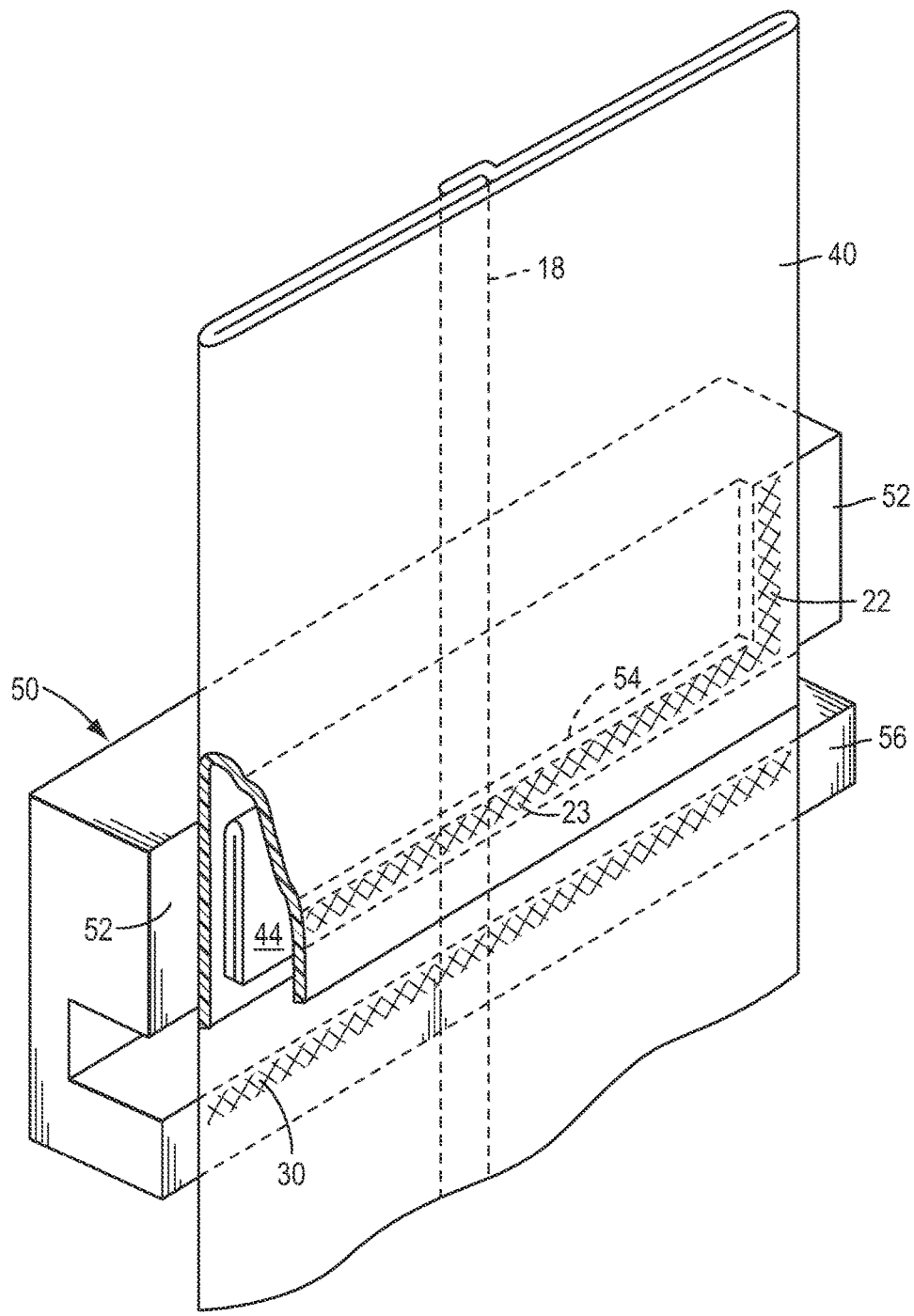
FIG. 9 is a diagrammatic view illustrating the orientation of the heat-sealing jaws with respect to the associated film web.

FIG. 9 diagrammatically illustrates the manner in which the cooperating heat-sealing jaws 50 act on the flexible web 40, and the individual sleeve 44 positioned generally within the folded web, for formation of bottom gusset of the package. It will be noted that in FIG. 9, the lateral margins of the flexible web 40 are joined to each other at the back package panel by a longitudinal seam 18'. By virtue of this orientation of the flexible web 40, sides seals 22 for the bottom gusset may be formed which do not necessarily extend substantially beyond the gusset itself, i.e., do not extend the entire length of the package. Simultaneous formation of the top seal 30 of an adjacent package is illustrated, with the understanding that the contents of this package would have been placed therein during the previous operational cycle of the sealing jaws 50.

Additional features of the present invention promote versatility and flexibility for practice of the invention. Packages having differently sized or configured bottom gussets can readily be formed by providing the sealing jaws with features which permit the specific configuration of the heat-seals to be readily altered. Such features, as shown in FIGS. 10A,B to FIGS. 12A,B, include providing each of one of the sealing jaws with a removable sealing jaw portion which provides at least a portion of the U-shaped shaped sealing surface.

Figure 10A:
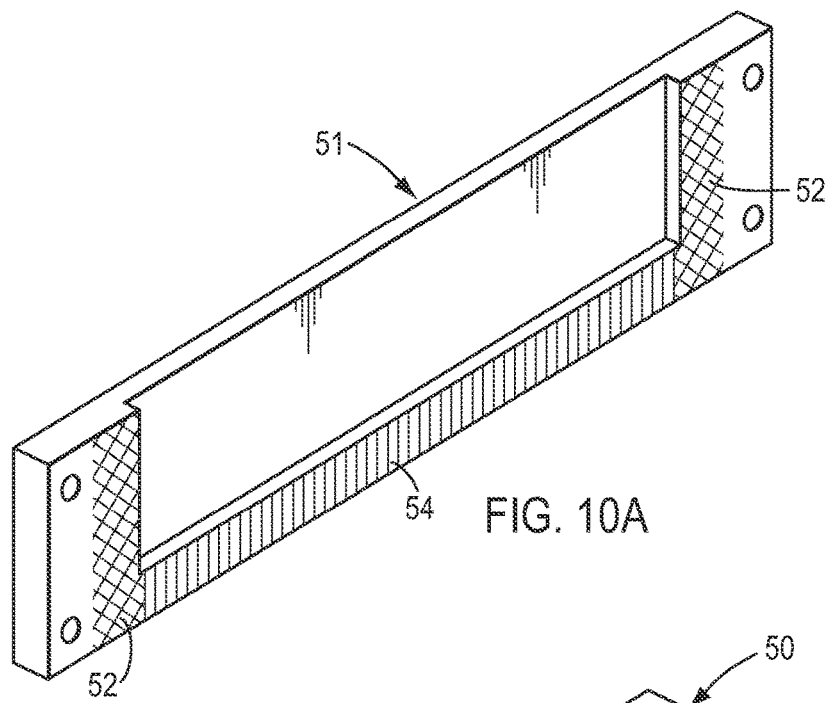
FIG. 10A is a diagrammatic view illustrating a removable sealing jaw portion for each one of a pair of heat-sealing jaws, whereby differently sized or configured heat-seals can be formed.
Figure 10B:
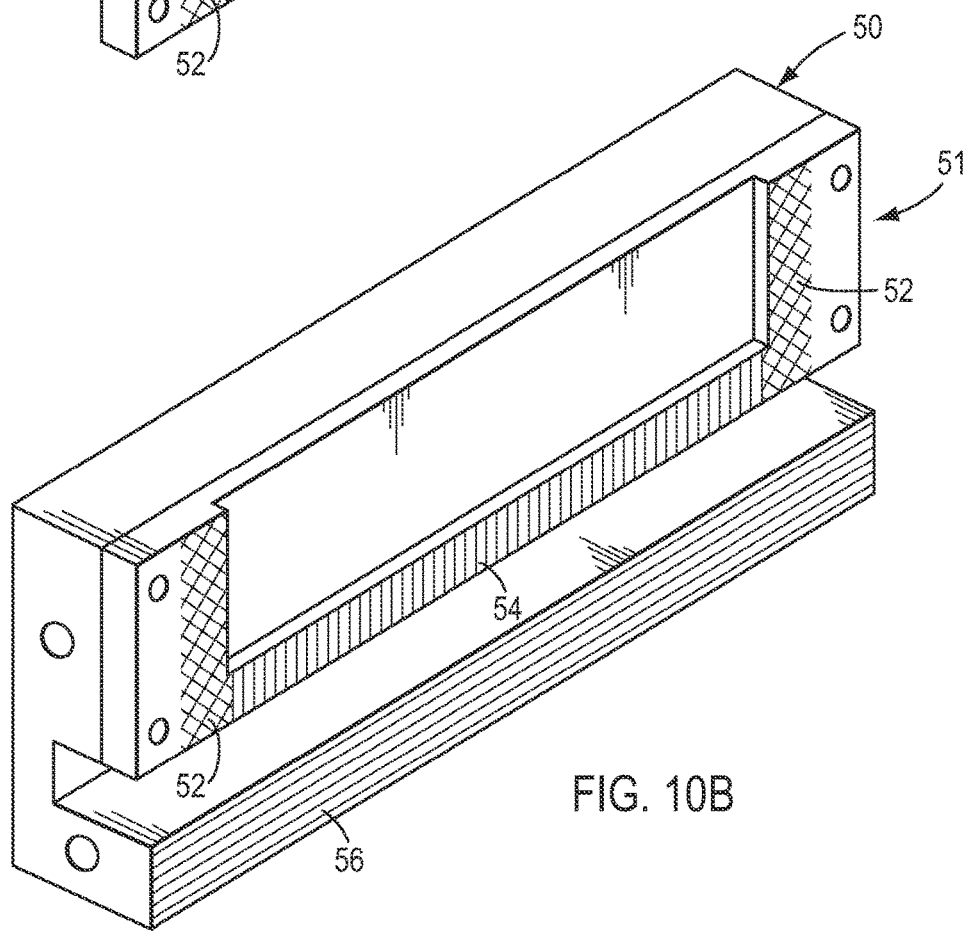
FIG. 10B shows the removable sealing jaw portion shown in FIG. 10A in an assembled condition on a respective one of the heat-sealing jaws.

FIG. 10A is a diagrammatic view illustrating a removable sealing jaw portion 51 for each one of the pair of the heat-sealing jaws 50, wherein the portion 51 includes side sealing surfaces 52 and bottom sealing surface 54. This arrangement of a removable jaw portion permits the same basic processing equipment to be used for forming packages having differently sized or configured bottom gussets. FIG. 10B shows the removable sealing jaw portion 51 in an assembled condition on a respective one of the heat-sealing jaws 50. This arrangement permits adjustment of package/gusset width, and end seal and gusset height.

Figure 11A:
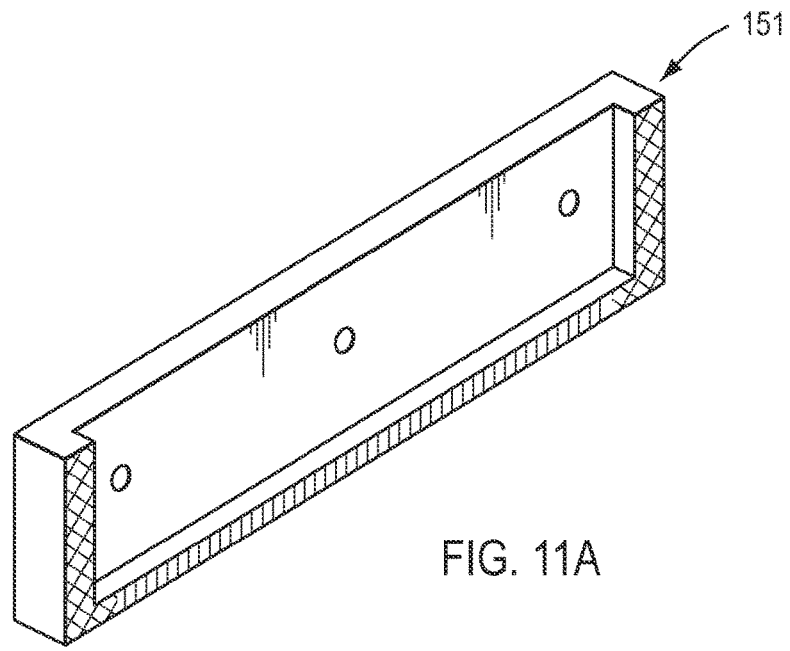
FIG. 11A is a diagrammatic view illustrating a removable sealing jaw portion for each one of a pair of heat-sealing jaws, whereby heat-seals of an increased size can be formed.
Figure 11B:
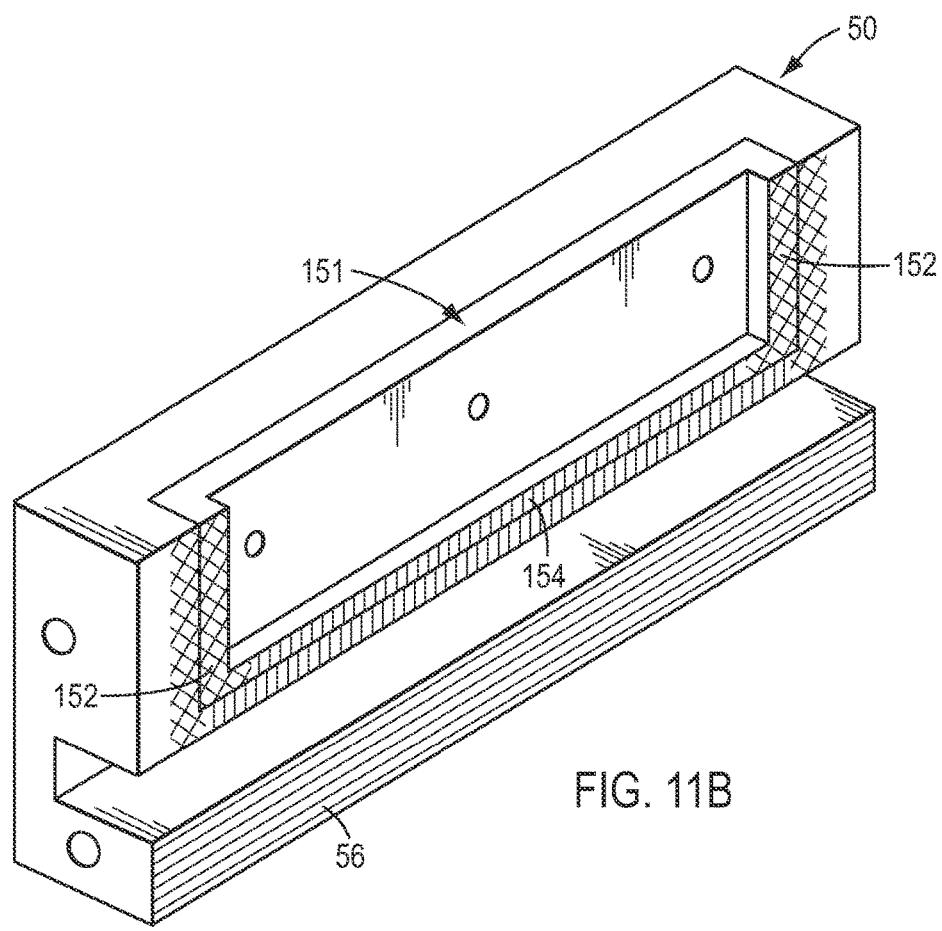
FIG. 11B shows the removable sealing jaw portion shown in FIG. 11A in an assembled condition on a respective one of the heat-sealing jaws.

FIG. 11A is a diagrammatic view illustrating a removable sealing jaw portion 151 for each one of the pair of heat-sealing jaws 50, whereby side and bottom heat-seals 152, 154 of an increased size can be formed. FIG. 11B shows the removable sealing jaw portion 151 in an assembled condition on a respective one of the heat-sealing jaws 50. This arrangement also permits adjustment of package/gusset width, and end seal and gusset height.

Figure 12A:
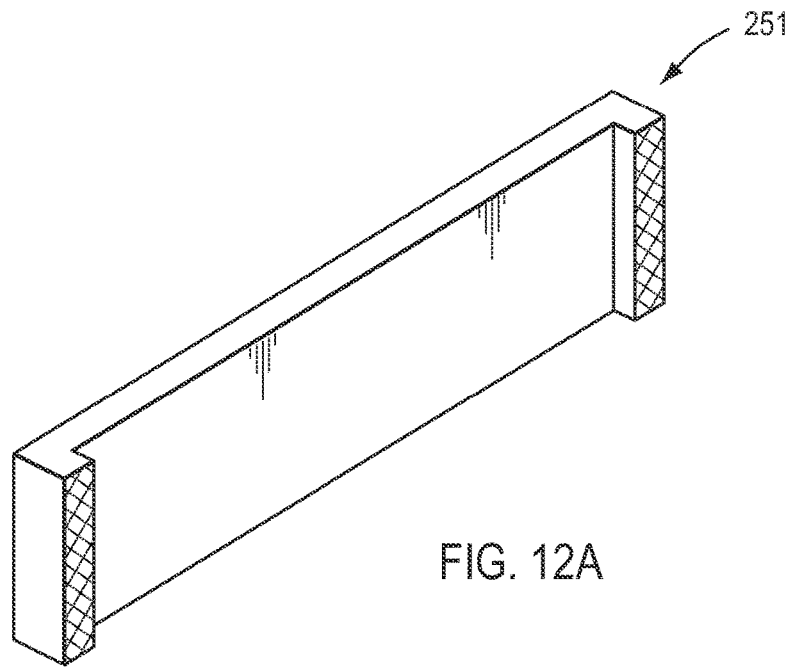
FIG. 12A is a diagrammatic view illustrating a removable sealing jaw portion for each one of a pair of heat-sealing jaws, whereby laterally opposite ones of the heat-seals of an increased size can be formed.
Figure 12B:
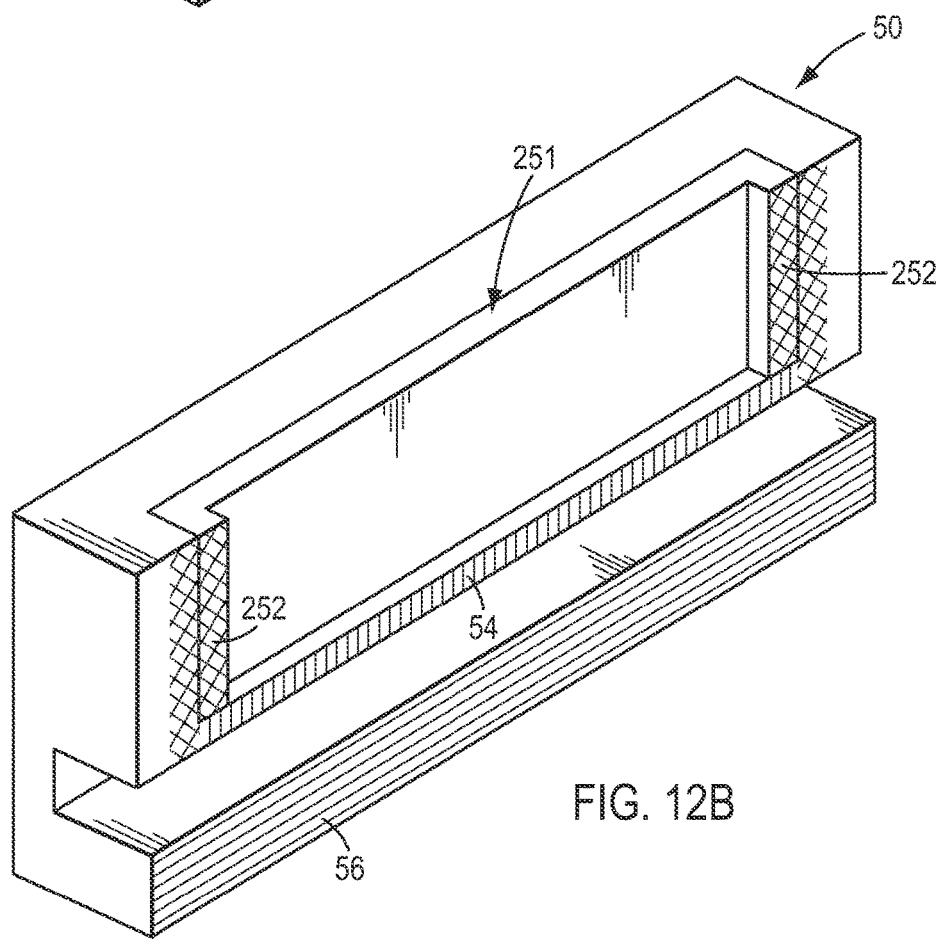
FIG. 12B shows the removable sealing jaw portion shown in FIG. 12A in an assembled condition on a respective one of the heat-sealing jaws.

The embodiment shown is FIG. 12A is similar to the previous embodiment, and shows a removable sealing jaw portion 252 for each one of the pair of heat-sealing jaws 50, but is configured provided side sealing surfaces 252 of an increased dimension, without a change in the dimensions of transverse sealing surface 54. FIG. 12B shows the removable sealing jaw portion 252 in an assembled condition on a respective one of the heat-sealing jaws 50. This arrangement permits adjustment of package/gusset width, and gusset height.

Figure 13:
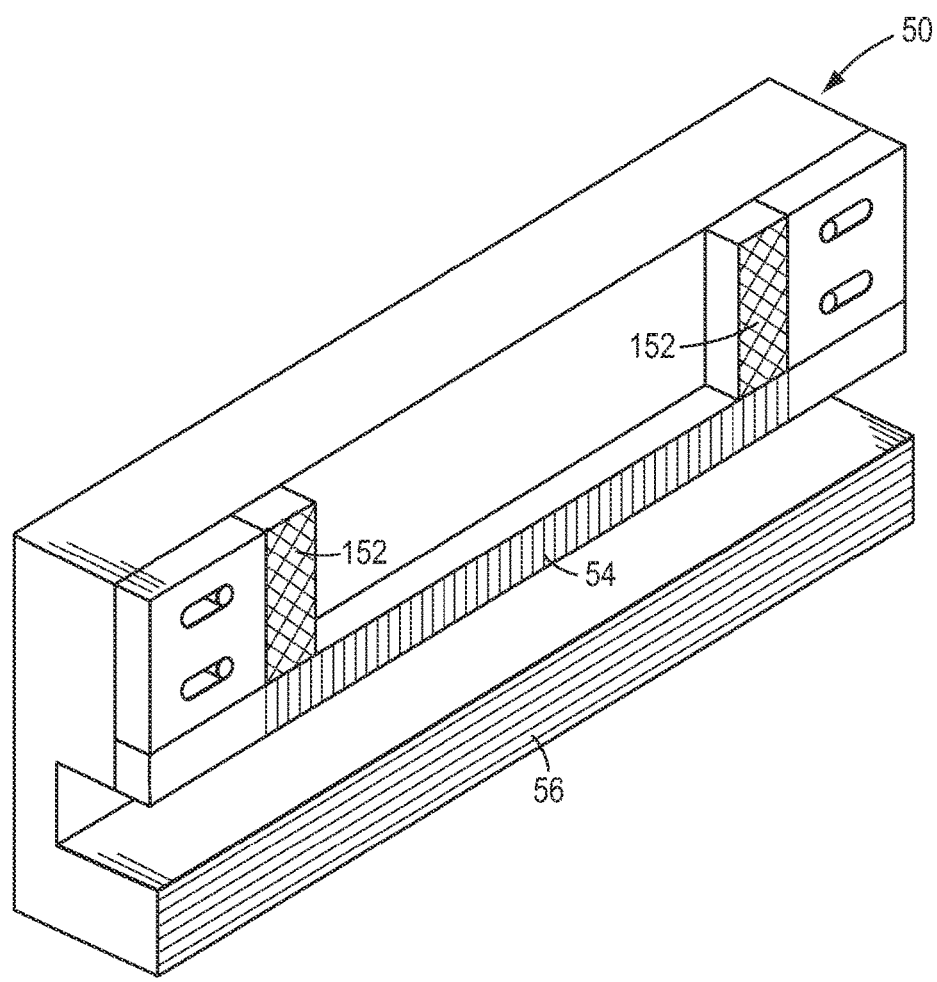
FIG. 13 is a diagrammatic view illustrating a heat-sealing jaw having laterally adjustable side sealing surfaces.

Alternatively, the sealing jaws can be configured such that the pair of side sealing surfaces of each one of the sealing jaws is laterally adjustable. Such an arrangement is illustrated in FIG. 13. In FIG. 13, each one of the sealing jaws 50 includes laterally adjustable side sealing surfaces 152 for adjustment of package/gusset width, and gusset height.

Figure 15:
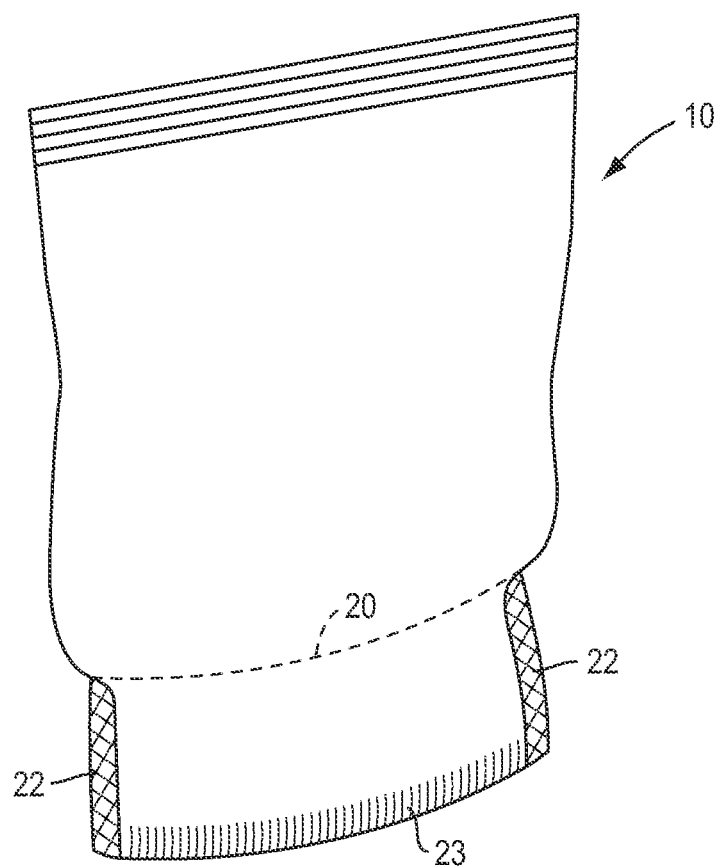
FIG. 15 is a diagrammatic view of a bottom-gusseted package, wherein the package contents outwardly deform or bulge the package above the bottom gusset.

Experience has shown that for some applications, the contents of bottom-gusseted packages can tend to outwardly deform or bulge the package in the region above the bottom gusset of the package. This effect is illustrated in the package 10 shown in FIG. 15, where the package contents tend to outwardly bulge the package above the bottom gusset 20. To minimize this effect, the pair of side sealing surfaces of each one of the sealing jaws can be provided with extended or lengthened sealing surfaces for heat-sealing the front and rear package panels to each other above the respective one of the individual sleeves forming the bottom gusset.

Figure 14:
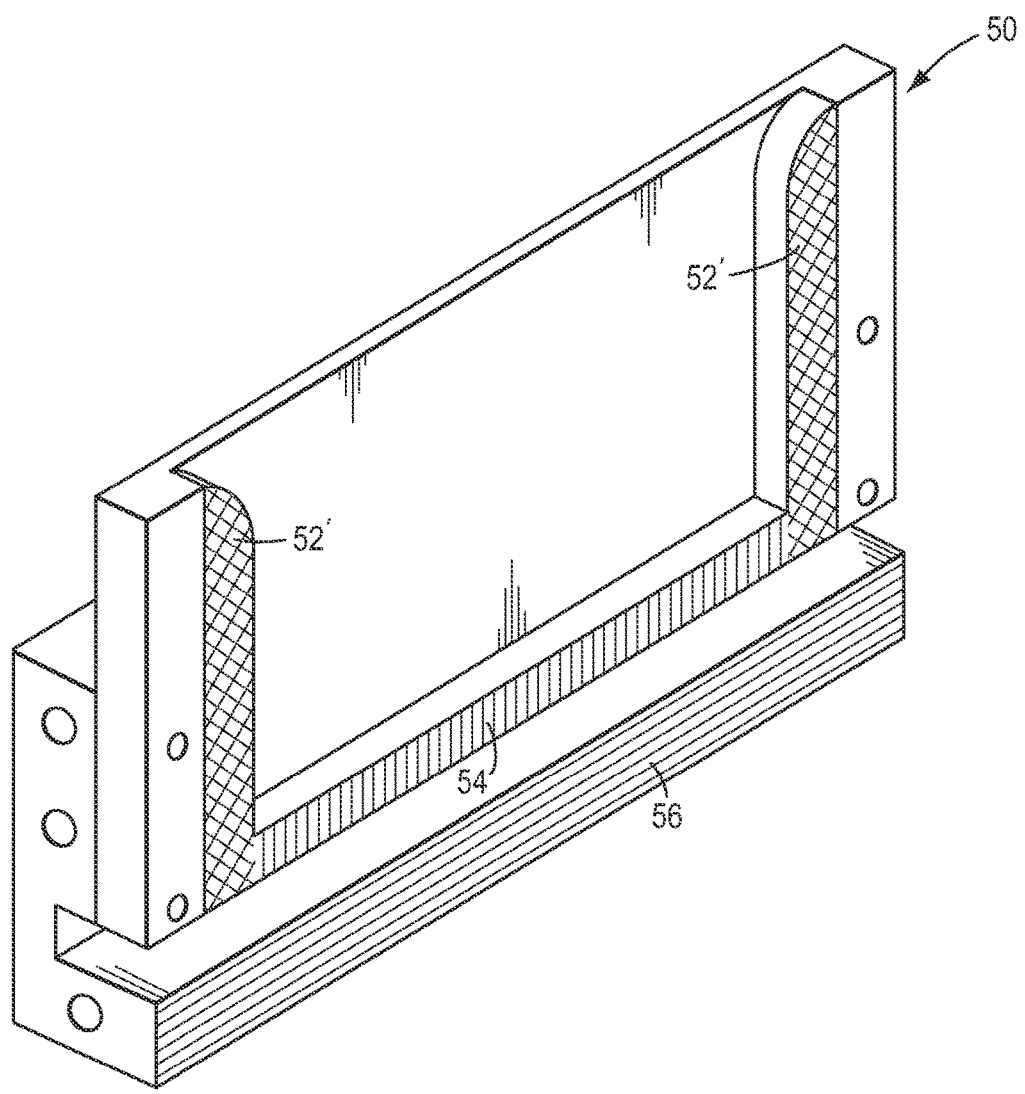
FIG. 14 is a diagrammatic view illustrating an embodiment of a heat-sealing jaw sealing surfaces for heat-sealing said front and rear package panels to each other above the respective one of individual sleeves forming a bottom gusset.

FIG. 14 is a diagrammatic view illustrating such an embodiment of a heat-sealing jaw 50, including extended side sealing surfaces 52' for heat-sealing the front and rear package panels to each other above the respective one of individual sleeves forming the bottom gusset of the package. This embodiment includes a face plate which may be larger than the remainder of the sealing jaw for providing the side sealing surfaces 52', with it presently contemplated that the face plate be heated by conduction by the one or more heating elements provided in the sealing jaw. Like the arrangement illustrated in FIGS. 10A and 10B, this arrangement permits adjustment of package/gusset width, and end seal and gusset height. FIG. 19 illustrates a resultant one of the packages 10.

Figure 16:
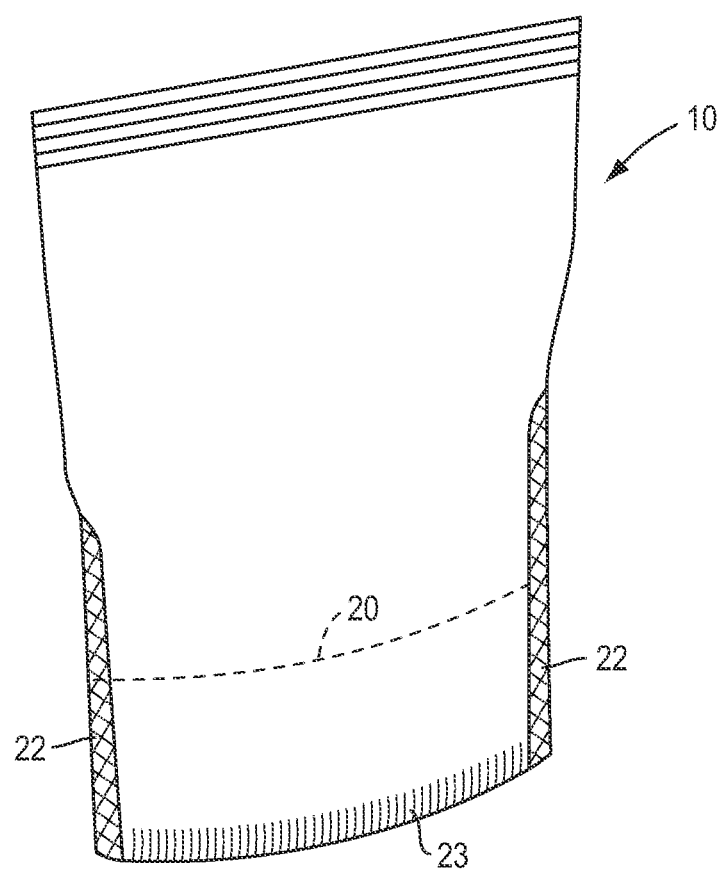
FIG. 16 is a diagrammatic view similar to FIG. 15, wherein side seals can be formed for heat-sealing front and rear package panels to each other above the bottom gusset of the package, such as by the use of heat-sealing jaws as illustrated in FIG. 14.

It should be noted that for some packages formed in accordance with the present invention, such as shown in FIG. 16, it may be desirable to form the side seals of the package with a tapering or varying width, with wider seal regions provided at a lower portion of the package, and narrower seal regions positioned above the wider regions. The side seals can be tapered or radiused to provide this effect, with this arrangement creating a pouch-like interior region for the package contents.

It should also be noted that illustrated embodiments of the sealing jaws for practice of the present invention are preferably provided with seal surfaces for creating specific type of seal configurations. In connection with the transverse sealing surface 54 of the sealing jaws 50, it is contemplated that vertically oriented sealed regions be created, since horizontally oriented sealed regions can in some instances tend to curl and deform, which can detract from the manner in which the bottom-gusseted package assume as a self-standing configuration. In contrast, the side sealing surfaces 52 preferably create a cross-hatched seal regions, which are believed to minimize any leakage or failure at these regions, and which can provide superior sealing in comparison to laterally extending sealed regions. Of course, it is to be understood that specific sealing configuration can be varied while keeping with the present invention.

While the various embodiments of the present invention effect formation of both bottom seals and side seals for formation of bottom-gusseted packages, it will be appreciated that for a number of the disclosed embodiments, the side sealing surfaces 52 of the sealing jaws can be moved, removed, or otherwise positioned to be outside of the width of packages being formed. This desirably permits the package forming equipment to form conventional, non bottom-gusseted packages, such as so-called "pillow pack" packages, or typical side-gusseted packages.

Figure 5:
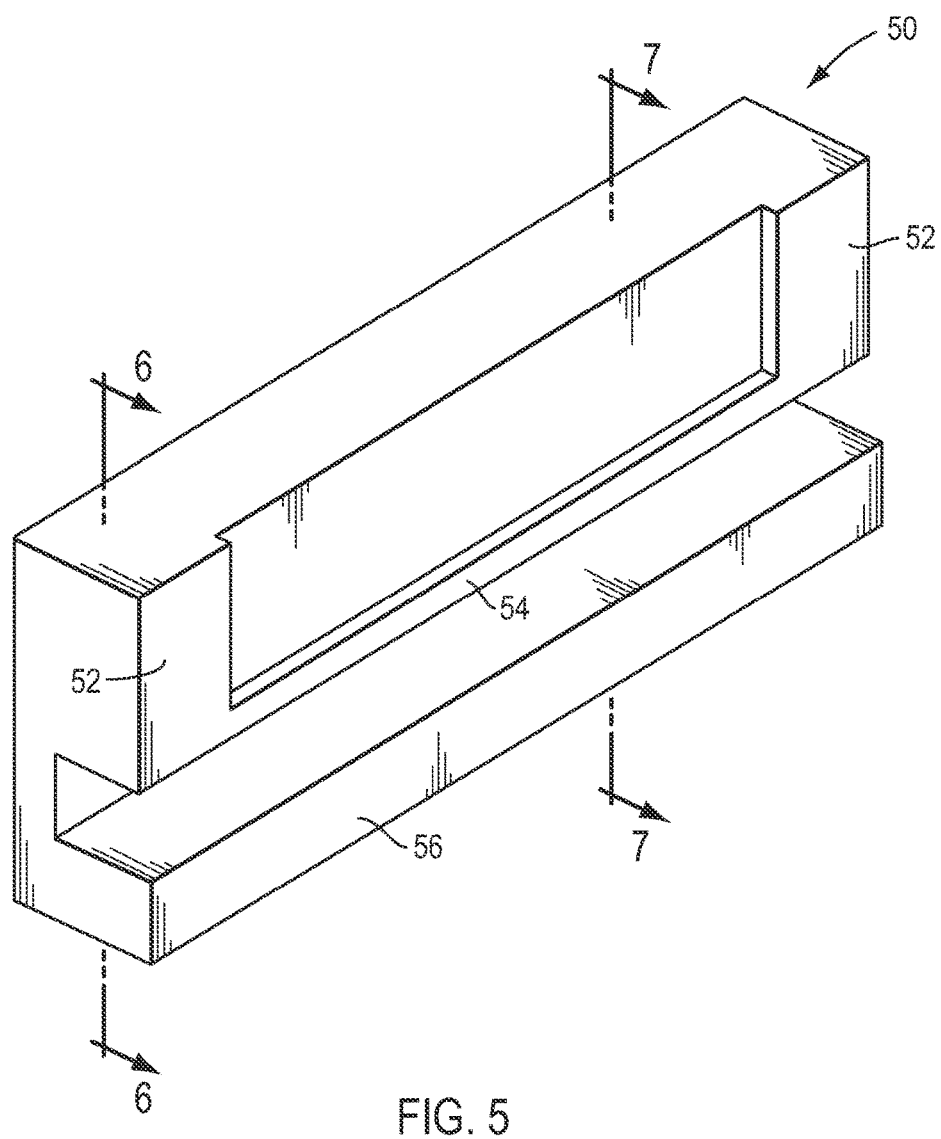
FIG. 5 is a diagrammatic view illustrating one of a pair of cooperating heat-sealing jaws for practice of the present invention.
Figure 6:
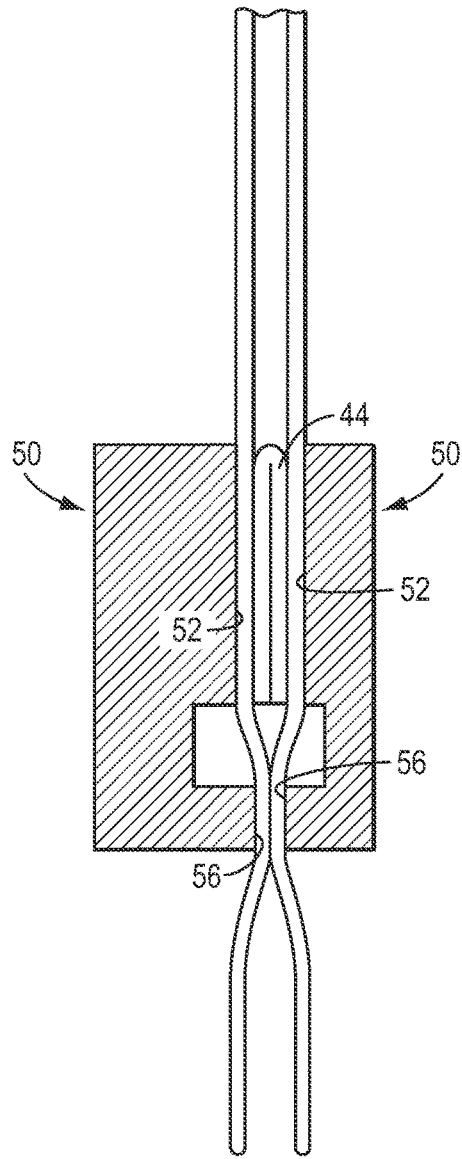
FIG. 6 is a cross-sectional view taken along lines 6-6 of FIG. 5.
Figure 7:
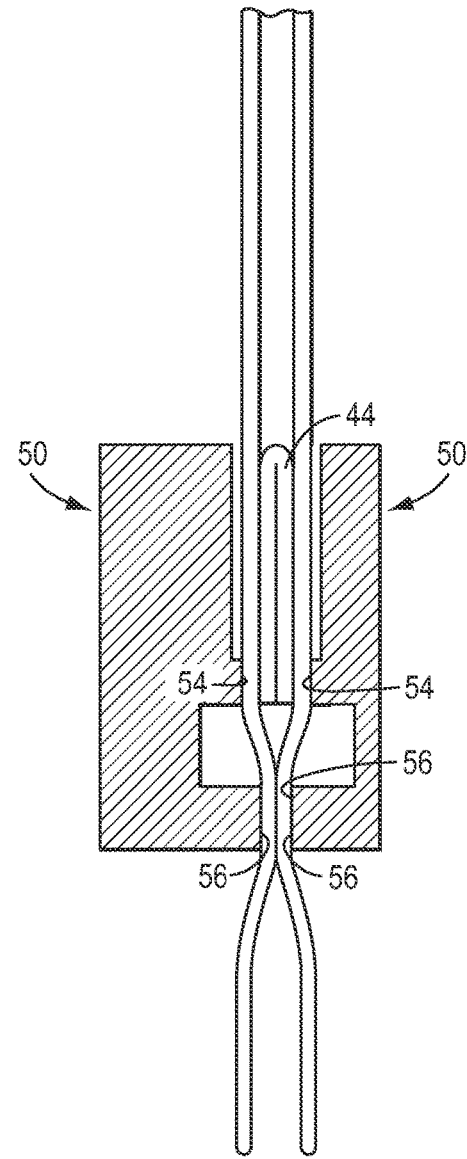
FIG. 7 is a cross-sectional view taken along lines 7-7 of FIG. 5.
Figure 17A:
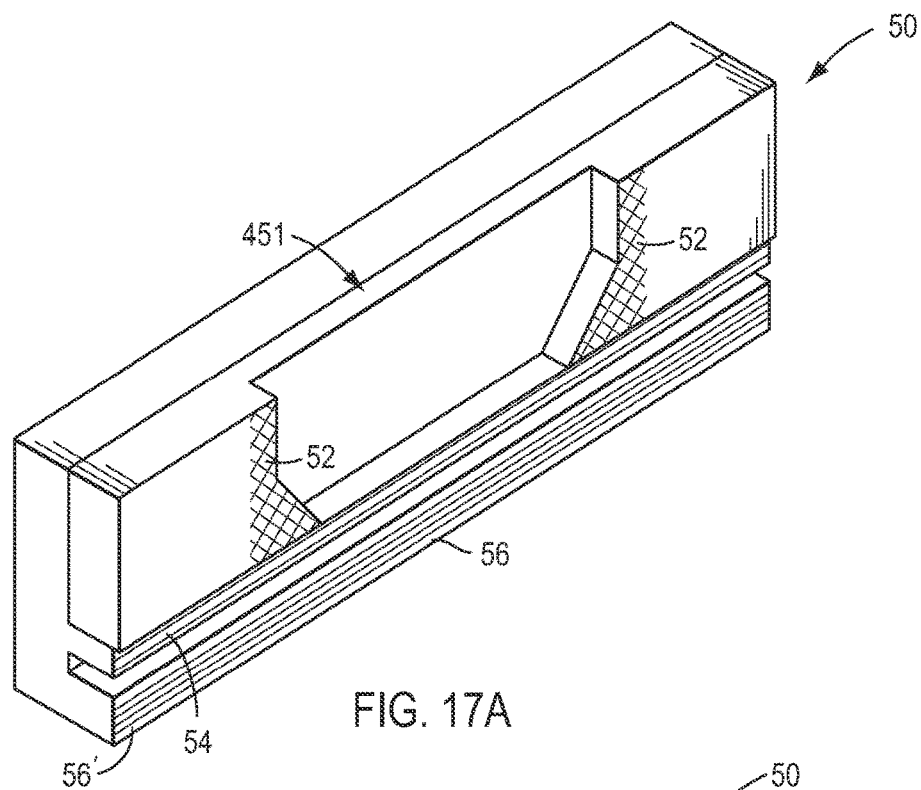
FIG. 17A is a diagrammatic view similar to FIG. 5, illustrating a sealing jaw configuration wherein a removable portion of the sealing jaw provides a pair of side sealing.

To this end, FIG. 17A is a diagrammatic view similar to FIG. 5, illustrating a sealing jaw configuration wherein a removable portion of the sealing jaw provides a pair of side sealing surfaces of the sealing jaw. As shown, the sealing jaw 50 includes a removable portion 451 which provides the side sealing surfaces 52 of the sealing jaw. As will be noted, the side sealing surfaces 52 are configured in this embodiment for forming side seals 22 of the package which taper inwardly toward each other in a region extending toward the bottom to the respective bottom gusset 20 of the package, thereby desirably rigidifying and strengthening this region of the package, and forming the package with a pouch-like interior.

It will also be noted that in this embodiment, the transverse sealing surface 54 of the sealing jaw is configured such that the spacing between the transverse sealing surfaces 54 of the sealing jaws, when the jaws are in a closed orientation, is greater than the spacing between the side sealing surfaces 52 of the sealing jaws. This configuration of the sealing jaws desirably accommodates variations in package thickness at regions of the package having differing numbers of plies or layers of film or other package material. For example, in the illustrated embodiment, the transverse sealing surface 54 can be recessed relative to the side sealing surfaces 52 by a dimension equal to twice the film thickness, generally corresponding to the thickness of each folded individual sleeve 44 which forms a respective bottom gusset 20. In this embodiment, the top sealing surface 56 includes a portion 56' which is similarly recessed relative to the side sealing surfaces 52, in this case to accommodate the variations in package thickness between that portion of the top seal 30 of the package into which the gusset-forming sleeve 44 extends from the adjacent package, and those portions of the top seal into which the sleeve 44 does not extend.

Figure 17B:
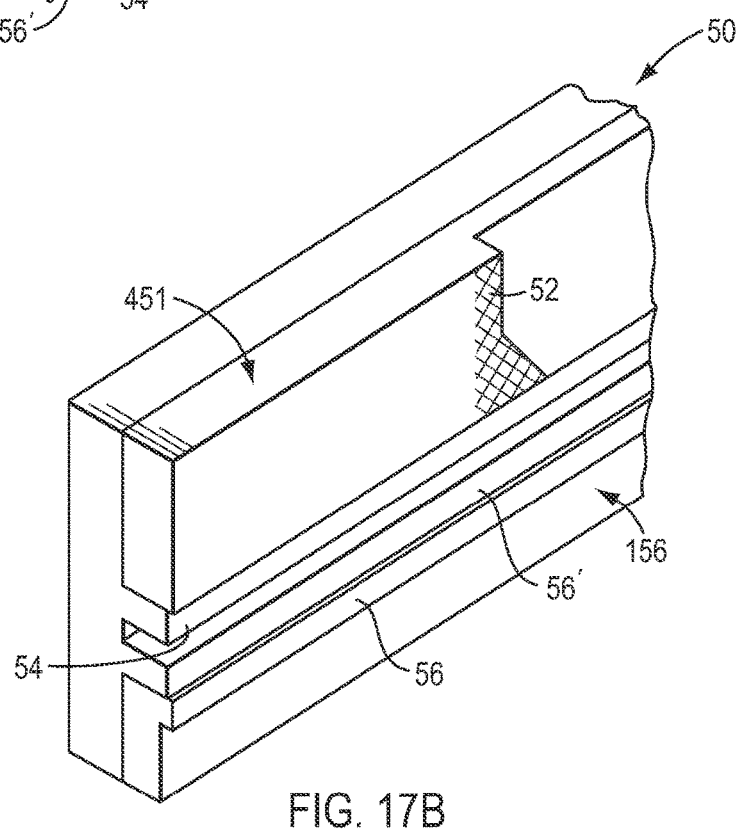
FIG. 17B is a fragmentary, diagrammatic view similar to FIG. 17A, illustrating a sealing jaw configuration wherein at least a portion of a top sealing surface of the sealing jaw is provided by removable portion of the sealing jaw.

FIG. 17B is a fragmentary, diagrammatic view similar to FIG. 17A, illustrating a sealing jaw configuration wherein at least a portion of a top sealing surface 56 of the sealing jaw is provided by removable portion 156 of the sealing jaw. Advantageously, this illustrated configuration of the sealing jaws enhances versatile use, since removal of removable portions 451 and 156 configures the sealing jaws for heat-sealing a non-gusseted, "pillow pack" package, without replacement of the sealing jaws. It is within the purview of the present invention that either or both of the removable portions 451 and 156 can be suitably shimmed or the like in order to accommodate sealing of package material which is relatively thick.

Figure 18:
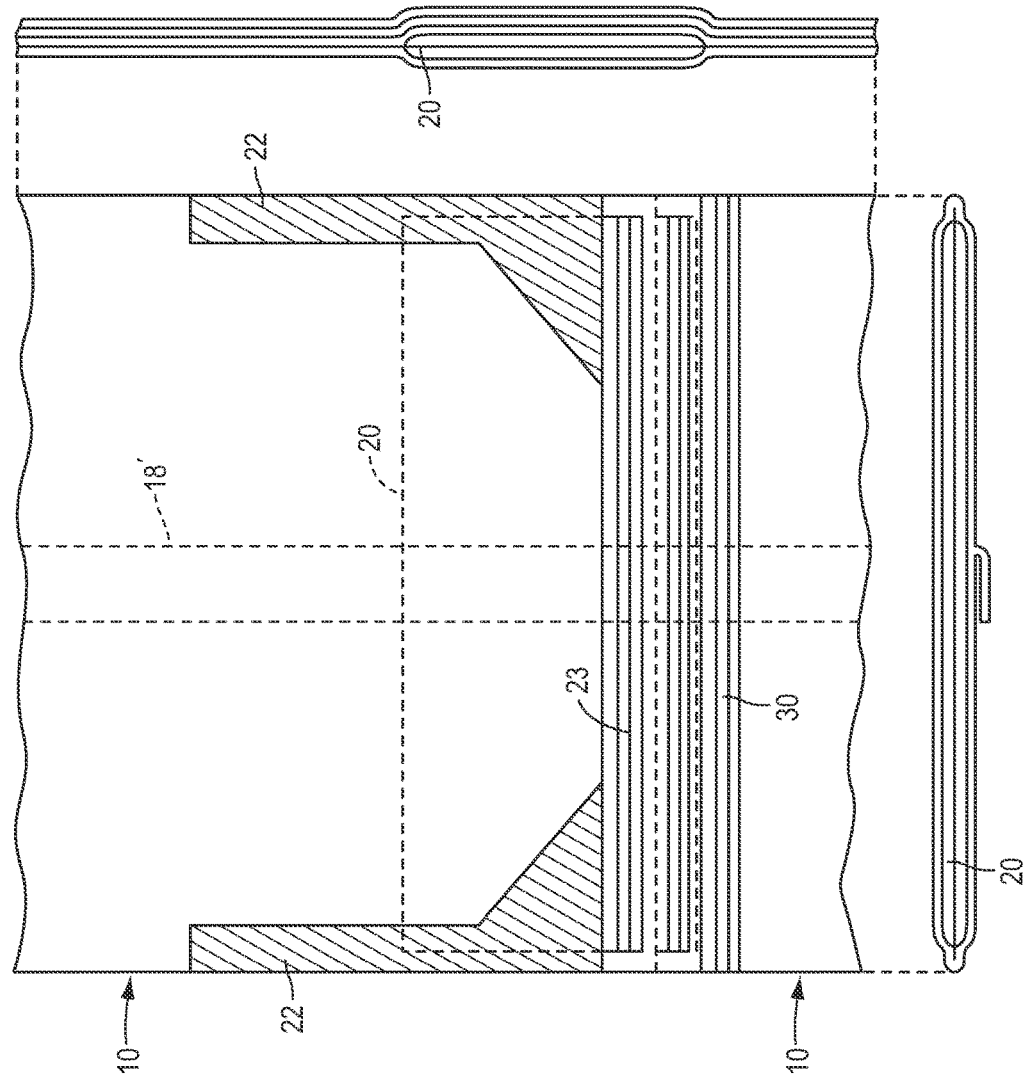
FIG. 18 is a diagrammatic view of a portion of a bottom-gusseted package, with illustrated cross-sectional projections, showing typical variations in package thickness at regions of differing numbers of plies or layers of package material.

FIG. 18 is a diagrammatic view of a portion of a bottom-gusseted package, with illustrated cross-sectional projections, showing typical variations in package thickness at regions of differing numbers of plies or layers of package material. By this illustration, showing the variations in package thickness, the spacing and configuring of the sealing jaws as described hereinabove will be appreciated.

In this illustration, the bottom-gusseted package 10 is shown with a so-called fin seal at the longitudinal seam 18' of the package. As shown, this type of seal in ordinarily two layers thick which, together with the two layers of the front and rear package panels, and the two layers of the folded gusset 20, results in some portions of the package being six layers thick. Adjacent regions of the illustrated package are four layers thick, while regions of the package along the lateral margins, laterally outwardly of the bottom gusset 20, are two layers thick.

The recessed configuration of certain portions of the sealing surfaces of the sealing jaws 50 accommodates these variations in package thickness. Experience has shown that the variation between portions of the package which vary by the thickness of two layers of the package film material can be accommodated by a planar sealing surface. Thus, with reference to FIG. 17A, side sealing surfaces 52 can effectively seal those portions of the package overlapping the gusset 20 (which portions are four layers thick) and the lateral margins of the package outwardly of the gusset (which margins are two layers thick.) Similarly, the relatively recessed transverse and top sealing surfaces 54, 56', can accommodate the variations in thickness between the portions of the package along which longitudinal seam 18' extends (which portion are six layers thick in the region of gusset 20) and adjacent regions into which the bottom gusset 20 extends (which adjacent regions are four layers thick.) It will be noted that when forming a package as illustrated in FIG. 18, a sealing jaw relief area is provided at each side of the package web, which areas have a thickness of two film layers. However, these areas are not critical to the sealing characteristics or strength of the package, while the illustrated embodiments ensure that the desired sealing integrity is maintained in those portions of the package at which it is required. The result of the illustrated arrangement is to promote efficient package formation, particularly when effected an a form, fill and seal machine.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A method of making bottom-gusseted packages, comprising the steps of:

providing a flexible web of material having a longitudinal axis, providing a plurality of folded, individual sleeves;

joining said individual sleeves to said flexible web in spaced apart relationship longitudinally of said flexible web, with the spacing between said individual sleeves corresponding to the length of each of said bottom-gusseted packages being formed, with laterally-extending edge portions of each individual sleeve oriented toward a bottom of the respective package;

folding said flexible web of material and joining lateral margins thereof to form a folded flexible web, and to thereby form a package body for each of said bottom-gusseted packages, each package body including a front package panel and a rear package panel joined at opposite side margins thereof, said individual sleeves being positioned within said folded flexible web to form a bottom gusset in the respective one of said packages;

providing a pair of cooperating sealing jaws to heat seal each of said individual sleeves to form the bottom gusset in each one of said packages, said sealing jaws including respective, cooperating, U-shaped sealing surfaces each including: (1) a pair of side sealing surfaces to heat-seal opposite lateral margins of each individual sleeve to the respective front and rear package panels at lateral margins thereof, and (2) a transverse sealing surface extending between said side sealing surfaces to respectively heat-seal said laterally-extending edge portions of each sleeve to the front and rear package panels at the bottom of each one of said packages, through the pair of cooperating sealing jaws, heat-sealing each of the individual sleeves to form the bottom gusset in each one of the of packages including heat-sealing the opposite lateral margins of each individual sleeve to the respective front and rear package panels at the lateral margins thereof and heat sealing the laterally-extending edge portions of each sleeve to the front and rear package panels at the bottom each one of said packages, and cutting said folded flexible web at intervals each corresponding in length to said length of each of said bottom-gusseted packages, to form said bottom-gusseted packages.

2. A method of making bottom-gusseted packages in accordance with claim 1, wherein said sealing jaws each further including a transverse, top sealing surface, spaced from the respective U-shaped sealing surface, said top sealing surfaces of said sealing jaws cooperating to heat seal the front and rear package panels to each other to form a top seal in an adjacent one of said packages simultaneously with heat-seals formed by said U-shaped sealing surfaces.

3. A method of making bottom-gusseted packages in accordance with claim 2, wherein the spacing between at least a portion of said top sealing surfaces is less than the spacing between said U-shaped sealing surfaces by a dimension equal to at least the thickness of each folded individual sleeve, when said pair of sealing jaws are in a closed orientation.

4. A method of making bottom-gusseted packages in accordance with claim 2, wherein
said top sealing surfaces include first portions spaced apart by a dimension which is the same as the spacing between said transverse sealing surfaces, and second portions spaced apart by a dimension which is the same as the spacing between said side sealing surfaces, when said sealing jaws are in said closed position.

5. A method of making bottom-gusseted packages in accordance with claim 2, wherein
at least a portion of the top sealing surface of each one of said sealing jaws includes at least one removable portion for permitting formation of non-gusseted packages.

6. A method of making bottom-gusseted packages in accordance with claim 1, wherein
the spacing between said transverse sealing surfaces of said U-shaped sealing surfaces is greater than the spacing between said side sealing surfaces of said U-shaped sealing surfaces, when said pair of sealing jaws are in a closed orientation.

7. A method of making bottom-gusseted packages in accordance with claim 1, including
forming each of said side seals with a dimension of at least $G_{SS}$, each of said side sealing surfaces having a transverse dimension greater than $G_{SS}$, wherein each of said individual sleeves has a lateral dimension to form a respective gusset having a width of $G_W$, the spacing between said side sealing surfaces of each of said sealing jaws being less than or equal to $G_W$ minus two times $G_{SS}$.

8. A method of making bottom-gusseted packages in accordance with claim 1, including:
intermittently advancing said flexible web of material after of said individual sleeves has been joined thereto, wherein the flexible web of material is advanced with a tolerance range of dimension $T_{LD}$,
wherein each of said gussets has a height $G_H$, and each of said side sealing surfaces of said U-shaped sealing surfaces extending upwardly from the respective transverse sealing surface by a dimension that is greater than or equal to $G_H$ plus two times $T_{LD}$.

9. A method of making bottom-gusseted packages in accordance with claim 1, including:
intermittently advancing said flexible web of material after said individual sleeves have been joined thereto, wherein the flexible web of material is advanced with a tolerance range of dimension $T_{LD}$,
said method including forming top and bottom end seals in adjacent ones of the packages being formed, wherein the spacing between the top and bottom end seals of adjacent ones of packages is equal to or greater than at least two times $T_{LD}$.

10. A method of making bottom-gusseted packages in accordance with claim 1, wherein
each of said individual sleeves has a length which is less than the width of the folded web of flexible material to facilitate formation of said bottom gusset with a width less than the width of the package to permit formation, by said U-shaped sealing surfaces, of side seals between the front and rear package panels of each said package at opposite side edges of the bottom gusset of the package.

11. A method of making bottom-gusseted packages in accordance with claim 1, wherein
said sleeve-forming web comprises a folded web of sleeve-forming material, wherein an inside surface of said of said folded sleeve-forming web non-thermally bondable to itself.

12. A method of making bottom-gusseted packages in accordance with claim 1, wherein
each one of said sealing jaws includes a removable sealing jaw portion to provide at least a portion of said U-shaped shaped sealing surface.

13. A method of making bottom-gusseted packages in accordance with claim 12, wherein
said removable sealing jaw portion provides said pair of side sealing surfaces.

14. A method of making bottom-gusseted packages in accordance with claim 1,
further comprising the step of heat-sealing said front and rear package panels to each other above the respective one of said individual sleeves forming said bottom gusset through the pair of cooperating sealing jaws.

* * * * *